United States Patent
Batzler et al.

(10) Patent No.: US 10,748,442 B2
(45) Date of Patent: *Aug. 18, 2020

(54) WELDING TRAINING SYSTEM

(71) Applicant: ILLINOIS TOOL WORKS INC., Glenview, IL (US)

(72) Inventors: Todd Gerald Batzler, Hortonville, WI (US); Bruce Patrick Albrecht, Neenah, WI (US); William Joshua Becker, Manitowoc, WI (US)

(73) Assignee: Illinois Tool Works Inc., Glenview, IL (US)

( * ) Notice: Subject to any disclaimer, the term of this patent is extended or adjusted under 35 U.S.C. 154(b) by 323 days.

This patent is subject to a terminal disclaimer.

(21) Appl. No.: 15/167,496

(22) Filed: May 27, 2016

(65) Prior Publication Data
US 2016/0358503 A1 Dec. 8, 2016

Related U.S. Application Data

(63) Continuation of application No. 12/473,392, filed on May 28, 2009, now Pat. No. 9,352,411.

(60) Provisional application No. 61/056,696, filed on May 28, 2008.

(51) Int. Cl.
| G09B 19/24 | (2006.01) |
| B23K 9/095 | (2006.01) |
| G09B 19/00 | (2006.01) |
| B23K 9/32 | (2006.01) |
| B23K 37/00 | (2006.01) |

(Continued)

(52) U.S. Cl.
CPC ............ *G09B 19/003* (2013.01); *B23K 9/095* (2013.01); *B23K 9/32* (2013.01); *B23K 37/00* (2013.01); *G09B 5/00* (2013.01); *G09B 19/24* (2013.01); *G05B 2219/37396* (2013.01); *G09B 9/00* (2013.01)

(58) Field of Classification Search
CPC ....... G09B 19/24; B23K 9/095; B23K 9/0953
See application file for complete search history.

(56) References Cited

U.S. PATENT DOCUMENTS

| 1,340,270 A | 5/1920 | Emil |
| 2,045,800 A | 6/1936 | Walther |
| 2,045,801 A | 6/1936 | Richter |

(Continued)

FOREIGN PATENT DOCUMENTS

| CA | 2311685 | 12/2001 |
| CA | 2517874 | 12/2001 |

(Continued)

OTHER PUBLICATIONS

Canadian Office Action Appln No. 2,961,093 dated Mar. 5, 2018 (4 pgs).

(Continued)

*Primary Examiner* — Robert J Utama
(74) *Attorney, Agent, or Firm* — McAndrews, Held & Malloy, Ltd.

(57) ABSTRACT

A welding training system includes one or more welding operator device which provides positional feedback relevant to a quality weld. The positional feedback is analyzed and, when the positional feedback is outside of a predetermined range, a signal is provided to the welding operator. In one embodiment, tactile feedback is provided in a welding gun.

17 Claims, 9 Drawing Sheets

(51) Int. Cl.
*G09B 5/00* (2006.01)
*G09B 9/00* (2006.01)

(56) References Cited

U.S. PATENT DOCUMENTS

| | | | |
|---|---|---|---|
| 2,045,802 A | 6/1936 | Walther | |
| 2,333,192 A | 10/1942 | Moberg | |
| 2,351,910 A | 6/1944 | Blankenbuehler | |
| 3,391,691 A | 7/1968 | Young | |
| 3,679,865 A | 7/1972 | Jesnitzer | |
| 3,867,769 A * | 2/1975 | Schow | G09B 19/24 |
| | | | 219/124.34 |
| 4,028,522 A | 6/1977 | Chihoski | |
| 4,041,615 A * | 8/1977 | Whitehill | A61B 5/16 |
| | | | 273/359 |
| 4,044,377 A | 8/1977 | Bowerman | |
| 4,124,944 A * | 11/1978 | Blair | G09B 19/24 |
| | | | 434/234 |
| 4,132,014 A * | 1/1979 | Schow | G09B 19/24 |
| | | | 434/234 |
| 4,144,766 A | 3/1979 | Wehrmeister | |
| 4,224,501 A | 9/1980 | Lindborn | |
| 4,253,648 A | 3/1981 | Meeks | |
| 4,294,440 A | 10/1981 | Severt | |
| 4,375,026 A | 2/1983 | Kearney | |
| 4,375,165 A | 3/1983 | deSterke | |
| 4,389,561 A | 6/1983 | Weman | |
| 4,396,945 A | 8/1983 | DiMatteo | |
| 4,410,787 A * | 10/1983 | Kremers | B23K 9/1274 |
| | | | 219/124.34 |
| 4,412,121 A | 10/1983 | Kremers | |
| 4,452,589 A * | 6/1984 | Denison | G09B 19/24 |
| | | | 219/136 |
| 4,459,114 A | 7/1984 | Barwick | |
| 4,471,207 A | 9/1984 | Hawkes | |
| 4,484,059 A | 11/1984 | Lillquist | |
| 4,518,361 A | 5/1985 | Conway | |
| 4,541,055 A | 9/1985 | Wolfe | |
| 4,555,614 A | 11/1985 | Morris | |
| 4,557,191 A | 12/1985 | Speicher | |
| 4,577,499 A | 3/1986 | Silke | |
| 4,590,356 A | 5/1986 | Povlick | |
| 4,591,689 A | 5/1986 | Brown | |
| 4,594,497 A | 6/1986 | Takahashi | |
| 4,595,186 A | 6/1986 | Reed | |
| 4,595,368 A | 6/1986 | Cole | |
| 4,595,820 A | 6/1986 | Richardson | |
| 4,609,806 A | 9/1986 | Grabkowski | |
| 4,628,176 A | 12/1986 | Kojima | |
| 4,638,146 A | 1/1987 | Koyama | |
| 4,641,292 A | 2/1987 | Tunnell | |
| 4,677,277 A | 6/1987 | Cook | |
| 4,680,014 A | 7/1987 | Paton | |
| 4,689,021 A | 8/1987 | Vasiliev | |
| 4,716,273 A | 12/1987 | Paton | |
| 4,721,947 A | 1/1988 | Brown | |
| 4,728,768 A | 3/1988 | Cueman | |
| 4,739,404 A | 4/1988 | Richardson | |
| 4,767,109 A | 8/1988 | Raketich | |
| 4,820,901 A | 4/1989 | Peviani | |
| 4,829,365 A | 5/1989 | Eichenlaub | |
| 4,830,261 A | 5/1989 | Mello | |
| 4,867,685 A | 9/1989 | Brush | |
| 4,868,649 A | 9/1989 | Gaudin | |
| 4,877,940 A | 10/1989 | Bangs | |
| 4,881,678 A | 11/1989 | Gaudin | |
| 4,920,249 A | 4/1990 | McLaughlin | |
| 4,931,018 A * | 6/1990 | Herbst | G09B 19/24 |
| | | | 345/10 |
| 4,937,427 A | 6/1990 | McVicker | |
| 4,943,702 A | 7/1990 | Richardson | |
| 4,954,690 A | 9/1990 | Kensrue | |
| 4,992,881 A | 2/1991 | Tomasek | |
| 4,996,409 A | 2/1991 | Paton | |
| 5,061,841 A | 10/1991 | Richardson | |
| 5,103,376 A | 4/1992 | Blonder | |
| 5,134,348 A * | 7/1992 | Izukawa | H02N 2/14 |
| | | | 310/116 |
| 5,171,966 A * | 12/1992 | Fukuoka | B23K 9/0216 |
| | | | 219/124.34 |
| 5,185,561 A | 2/1993 | Good | |
| 5,208,436 A | 5/1993 | Blankenship | |
| 5,211,564 A | 8/1993 | Martinez | |
| 5,231,928 A | 8/1993 | Phillips | |
| 5,243,265 A | 9/1993 | Matsuura | |
| 5,281,921 A | 1/1994 | Novak | |
| 5,283,418 A | 2/1994 | Bellows | |
| 5,302,799 A | 4/1994 | Kennedy | |
| 5,304,774 A | 4/1994 | Durheim | |
| 5,306,893 A | 4/1994 | Morris | |
| 5,320,538 A | 6/1994 | Baum | |
| 5,343,011 A | 8/1994 | Fujii | |
| 5,380,978 A | 1/1995 | Pryor | |
| 5,397,872 A | 3/1995 | Baker | |
| 5,404,181 A | 4/1995 | Hung | |
| 5,426,732 A | 6/1995 | Boies | |
| 5,448,405 A | 9/1995 | Clausen | |
| 5,464,957 A | 11/1995 | Kidwell | |
| 5,508,757 A | 4/1996 | Chen | |
| 5,514,846 A | 5/1996 | Cecil | |
| 5,517,420 A | 5/1996 | Kinsman | |
| 5,521,843 A | 5/1996 | Hashima | |
| 5,533,146 A | 7/1996 | Iwai | |
| 5,543,863 A | 8/1996 | Lin | |
| 5,546,476 A | 8/1996 | Mitaka | |
| 5,571,431 A | 11/1996 | Lantieri | |
| 5,592,241 A | 1/1997 | Kita | |
| 5,617,335 A | 4/1997 | Hashima | |
| 5,659,479 A | 8/1997 | Duley | |
| 5,668,612 A | 9/1997 | Hung | |
| 5,674,415 A | 10/1997 | Leong | |
| 5,675,229 A | 10/1997 | Thorne | |
| 5,681,490 A | 10/1997 | Chang | |
| 5,708,253 A | 1/1998 | Bloch | |
| 5,709,219 A | 1/1998 | Chen | |
| 5,747,042 A | 5/1998 | Choquet | |
| 5,823,785 A * | 10/1998 | Matherne, Jr. | G09B 19/24 |
| | | | 434/234 |
| 5,832,139 A | 11/1998 | Batterman | |
| 5,845,053 A | 12/1998 | Watanabe | |
| 5,856,844 A | 1/1999 | Batterman | |
| 5,930,093 A | 7/1999 | Morrissett | |
| 5,961,859 A | 10/1999 | Chou | |
| 5,973,677 A | 10/1999 | Gibbons | |
| 5,999,909 A | 12/1999 | Rakshit | |
| 6,003,052 A | 12/1999 | Yamagata | |
| 6,018,729 A | 1/2000 | Zacharia | |
| 6,019,359 A | 2/2000 | Fly | |
| 6,024,273 A | 2/2000 | Ludewig | |
| 6,033,226 A | 3/2000 | Bullen | |
| 6,039,494 A | 3/2000 | Pearce | |
| 6,046,431 A | 4/2000 | Beattie | |
| 6,046,754 A | 4/2000 | Stanek | |
| 6,049,059 A | 4/2000 | Kim | |
| 6,051,805 A * | 4/2000 | Vaidya | B23K 9/0953 |
| | | | 219/130.01 |
| 6,084,195 A * | 7/2000 | Swaggerty | B23K 11/252 |
| | | | 219/109 |
| 6,101,455 A | 8/2000 | Davis | |
| 6,107,601 A | 8/2000 | Shimogama | |
| 6,115,025 A | 9/2000 | Buxton | |
| 6,130,407 A | 10/2000 | Villafuerte | |
| 6,136,946 A | 10/2000 | Yao | |
| 6,153,848 A | 11/2000 | Nagae | |
| 6,155,475 A | 12/2000 | Ekelof | |
| 6,163,946 A | 12/2000 | Pryor | |
| 6,184,868 B1 * | 2/2001 | Shahoian | A63F 13/06 |
| | | | 345/156 |
| 6,226,395 B1 | 5/2001 | Gilliland | |
| 6,236,017 B1 | 5/2001 | Smartt | |
| 6,242,711 B1 | 6/2001 | Cooper | |
| 6,271,500 B1 | 8/2001 | Hirayama | |
| 6,288,359 B1 | 9/2001 | Koch | |
| 6,290,740 B1 | 9/2001 | Schaefer | |

(56) References Cited

U.S. PATENT DOCUMENTS

| | | |
|---|---|---|
| 6,301,763 B1 | 10/2001 | Pryor |
| 6,315,186 B1 | 11/2001 | Friedl |
| 6,329,635 B1 | 12/2001 | Leong |
| 6,337,458 B1 | 1/2002 | Lepeltier |
| 6,371,765 B1 | 4/2002 | Wall |
| 6,417,894 B1 | 7/2002 | Goff |
| 6,441,342 B1 | 8/2002 | Hsu |
| 6,445,964 B1 | 9/2002 | White |
| 6,469,752 B1 | 10/2002 | Ishikawa |
| 6,476,354 B1 | 11/2002 | Jank |
| 6,479,793 B1 | 11/2002 | Wittmann |
| 6,506,997 B2 * | 1/2003 | Matsuyama ......... B23K 11/252 219/109 |
| 6,516,300 B1 | 2/2003 | Rakshit |
| 6,572,379 B1 | 6/2003 | Sears |
| 6,583,386 B1 | 6/2003 | Ivkovich |
| 6,596,972 B1 | 7/2003 | Di Novo |
| 6,614,002 B2 | 9/2003 | Weber |
| 6,621,049 B2 | 9/2003 | Suzuki |
| 6,622,906 B1 | 9/2003 | Kushibe |
| 6,647,288 B2 | 11/2003 | Madill |
| 6,670,574 B1 | 12/2003 | Bates |
| 6,697,761 B2 | 2/2004 | Akatsuka |
| 6,703,585 B2 | 3/2004 | Suzuki |
| 6,710,298 B2 | 3/2004 | Eriksson |
| 6,728,582 B1 * | 4/2004 | Wallack ........... G05B 19/41875 382/153 |
| 6,734,393 B1 | 5/2004 | Friedl |
| 6,744,011 B1 | 6/2004 | Hu |
| 6,748,249 B1 | 6/2004 | Eromaki |
| 6,750,428 B2 | 6/2004 | Okamoto |
| 6,753,909 B1 | 6/2004 | Westerman |
| 6,768,974 B1 | 7/2004 | Nanjundan |
| 6,795,068 B1 | 9/2004 | Marks |
| 6,839,049 B1 | 1/2005 | Koizumi |
| 6,857,553 B1 | 2/2005 | Hartman |
| 6,868,726 B2 | 3/2005 | Lemkin |
| 6,910,971 B2 | 6/2005 | Alsenz |
| 6,927,360 B2 | 8/2005 | Artelsmair |
| 6,937,329 B2 | 8/2005 | Esmiller |
| 6,967,635 B2 | 11/2005 | Hung |
| 6,977,357 B2 | 12/2005 | Hsu |
| 6,995,536 B2 | 2/2006 | Challoner |
| 7,015,419 B2 | 3/2006 | Hackl |
| 7,025,053 B1 | 4/2006 | Altamirano |
| 7,032,814 B2 | 4/2006 | Blankenship |
| 7,045,742 B2 | 5/2006 | Feichtinger |
| 7,081,888 B2 | 7/2006 | Cok |
| 7,120,473 B1 | 10/2006 | Hawkins |
| 7,132,617 B2 | 11/2006 | Lee |
| 7,132,623 B2 | 11/2006 | DeMiranda |
| 7,150,047 B2 | 12/2006 | Fergason |
| 7,173,215 B1 | 2/2007 | Kapoor |
| 7,181,413 B2 | 2/2007 | Hadden |
| 7,182,691 B1 * | 2/2007 | Schena ................. A63F 13/06 463/38 |
| 7,226,176 B1 | 6/2007 | Huang |
| 7,261,261 B2 | 8/2007 | Ligertwood |
| 7,342,210 B2 | 3/2008 | Fergason |
| 7,358,458 B2 | 4/2008 | Daniel |
| 7,465,230 B2 | 12/2008 | LeMay |
| 7,474,760 B2 | 1/2009 | Hertzman |
| 7,523,069 B1 | 4/2009 | Friedl |
| 7,564,005 B2 | 7/2009 | Cabanaw |
| 7,574,172 B2 | 8/2009 | Clark |
| 7,577,285 B2 | 8/2009 | Schwarz |
| D614,217 S | 4/2010 | Peters |
| 7,698,094 B2 | 4/2010 | Aratani |
| D615,573 S | 5/2010 | Peters |
| 7,766,213 B2 | 8/2010 | Henrikson |
| 7,789,811 B2 | 9/2010 | Cooper |
| 7,813,830 B2 | 10/2010 | Summers |
| 7,826,984 B2 | 11/2010 | Sjostrand |
| 7,831,098 B2 | 11/2010 | Melikian |
| 7,839,416 B2 | 11/2010 | Ebensberger |
| 7,845,560 B2 | 12/2010 | Emanuel |
| D631,074 S | 1/2011 | Peters |
| 7,899,618 B2 | 3/2011 | Ledet |
| 7,962,967 B2 | 6/2011 | Becker |
| 8,019,144 B2 | 9/2011 | Sugihara |
| 8,046,178 B2 | 10/2011 | Dai |
| 8,100,694 B2 | 1/2012 | Portoghese |
| 8,110,774 B2 | 2/2012 | Huonker |
| 8,235,588 B2 | 8/2012 | Louban |
| 8,248,324 B2 | 8/2012 | Nangle |
| 8,274,013 B2 | 9/2012 | Wallace |
| 8,393,519 B2 | 3/2013 | Allehaux |
| 8,431,862 B2 | 4/2013 | Kachline |
| 8,502,866 B2 | 8/2013 | Becker |
| 8,512,043 B2 * | 8/2013 | Choquet ............. A61B 5/1124 219/50 |
| 8,541,746 B2 | 9/2013 | Andres |
| 8,569,646 B2 * | 10/2013 | Daniel ................ B23K 9/0953 219/110 |
| 8,657,605 B2 | 2/2014 | Wallace |
| 8,686,318 B2 | 4/2014 | Albrecht |
| 8,692,157 B2 | 4/2014 | Daniel |
| 8,708,702 B2 * | 4/2014 | Paul ....................... G09B 5/00 434/156 |
| 8,747,116 B2 | 6/2014 | Zboray |
| 8,777,629 B2 | 7/2014 | Kreindl |
| 8,834,168 B2 | 9/2014 | Peters |
| 8,851,896 B2 | 10/2014 | Wallace |
| 8,911,237 B2 | 12/2014 | Postlethwaite |
| 8,915,740 B2 | 12/2014 | Zboray |
| 8,953,909 B2 | 2/2015 | Guckenberger |
| RE45,398 E | 3/2015 | Wallace |
| 8,987,628 B2 | 3/2015 | Daniel |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,089,921 B2 | 7/2015 | Daniel |
| 9,196,169 B2 | 11/2015 | Wallace |
| 9,218,745 B2 | 12/2015 | Choquet |
| 9,230,449 B2 | 1/2016 | Conrardy |
| 9,269,279 B2 | 2/2016 | Penrod |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,402,122 B2 | 7/2016 | Richardson |
| 9,685,099 B2 | 6/2017 | Boulware |
| 9,724,787 B2 | 8/2017 | Becker |
| 9,789,603 B2 * | 10/2017 | Jacobsen .................... B25J 3/04 |
| 2001/0026445 A1 | 10/2001 | Naghi |
| 2001/0032508 A1 | 10/2001 | Lemkin |
| 2002/0043607 A1 | 4/2002 | Tajima |
| 2002/0071550 A1 | 6/2002 | Pletikosa |
| 2002/0105797 A1 | 8/2002 | Navid |
| 2002/0114653 A1 | 8/2002 | Gatta |
| 2002/0148745 A1 | 10/2002 | Chang |
| 2002/0153354 A1 | 10/2002 | Norby |
| 2003/0011673 A1 | 1/2003 | Eriksson |
| 2003/0092496 A1 | 5/2003 | Alsenz |
| 2003/0172032 A1 | 9/2003 | Choquet |
| 2004/0058703 A1 | 3/2004 | Eromaki |
| 2004/0068335 A1 | 4/2004 | Ferla |
| 2004/0069754 A1 | 4/2004 | Bates |
| 2004/0099648 A1 | 5/2004 | Hu |
| 2004/0175684 A1 | 9/2004 | Kaasa |
| 2004/0223148 A1 | 11/2004 | Takemura |
| 2004/0227730 A1 | 11/2004 | Sugihara |
| 2004/0251910 A1 | 12/2004 | Smith |
| 2005/0006363 A1 | 1/2005 | Hsu |
| 2005/0012598 A1 | 1/2005 | Berquist |
| 2005/0016979 A1 | 1/2005 | Stein |
| 2005/0017152 A1 | 1/2005 | Fergason |
| 2005/0073506 A1 | 4/2005 | Durso |
| 2005/0127052 A1 | 6/2005 | Spencer |
| 2005/0133488 A1 | 6/2005 | Blankenship |
| 2005/0135682 A1 | 6/2005 | Abrams |
| 2005/0179654 A1 | 8/2005 | Hawkins |

(56) References Cited

U.S. PATENT DOCUMENTS

| | | |
|---|---|---|
| 2005/0197115 A1 | 9/2005 | Clark |
| 2005/0207102 A1 | 9/2005 | Russo |
| 2005/0219206 A1* | 10/2005 | Schena .................. G06F 3/016 345/156 |
| 2005/0227635 A1 | 10/2005 | Hawkins |
| 2005/0256611 A1 | 11/2005 | Pretlove |
| 2006/0010551 A1 | 1/2006 | Bishop |
| 2006/0081740 A1 | 4/2006 | Bellavance |
| 2006/0136183 A1 | 6/2006 | Choquet |
| 2006/0151446 A1 | 7/2006 | Schneider |
| 2006/0163228 A1* | 7/2006 | Daniel ................. B23K 9/0956 219/130.01 |
| 2006/0173619 A1 | 8/2006 | Brant |
| 2006/0212169 A1 | 9/2006 | Luthardt |
| 2006/0241432 A1 | 10/2006 | Herline |
| 2007/0038400 A1 | 2/2007 | Lee |
| 2007/0051711 A1 | 3/2007 | Kachline |
| 2007/0056942 A1 | 3/2007 | Daniel et al. |
| 2007/0086508 A1* | 4/2007 | Reading ................. B23K 37/00 374/208 |
| 2007/0114215 A1* | 5/2007 | Bill ....................... B23K 9/0008 219/130.01 |
| 2007/0115202 A1 | 5/2007 | Kiesenhofer |
| 2007/0164006 A1* | 7/2007 | Burgstaller .......... B23K 9/0953 219/130.01 |
| 2007/0187378 A1* | 8/2007 | Karakas ............... B23K 9/1087 219/130.21 |
| 2007/0188606 A1 | 8/2007 | Atkinson |
| 2007/0209586 A1* | 9/2007 | Ebensberger ............ G09B 9/00 118/682 |
| 2007/0221636 A1 | 9/2007 | Monzyk |
| 2007/0247793 A1 | 10/2007 | Carnevali |
| 2007/0248261 A1 | 10/2007 | Zhou |
| 2007/0264620 A1 | 11/2007 | Maddix |
| 2007/0278196 A1 | 12/2007 | James |
| 2007/0291166 A1 | 12/2007 | Misawa |
| 2008/0030631 A1 | 2/2008 | Gallagher |
| 2008/0038702 A1* | 2/2008 | Choquet ............... A61B 5/1124 434/260 |
| 2008/0061113 A9 | 3/2008 | Seki |
| 2008/0077422 A1 | 3/2008 | Dooley |
| 2008/0124698 A1 | 5/2008 | Ebensberger |
| 2008/0128395 A1 | 6/2008 | Aigner |
| 2008/0128400 A1 | 6/2008 | Michels |
| 2008/0149602 A1 | 6/2008 | Lenzner |
| 2008/0149608 A1 | 6/2008 | Albrecht |
| 2008/0158502 A1 | 7/2008 | Becker |
| 2008/0168290 A1 | 7/2008 | Jobs |
| 2008/0169277 A1* | 7/2008 | Achtner ................. B23K 9/167 219/136 |
| 2008/0234960 A1 | 9/2008 | Byington |
| 2008/0314887 A1 | 12/2008 | Stoger |
| 2009/0005728 A1 | 1/2009 | Weinert |
| 2009/0057285 A1 | 3/2009 | Bashore |
| 2009/0057286 A1 | 3/2009 | Ihara |
| 2009/0109128 A1 | 4/2009 | Nangle |
| 2009/0146359 A1 | 6/2009 | Canfield |
| 2009/0152251 A1 | 6/2009 | Dantinne |
| 2009/0161212 A1 | 6/2009 | Gough |
| 2009/0173726 A1 | 7/2009 | Davidson |
| 2009/0189974 A1 | 7/2009 | Deering |
| 2009/0190826 A1 | 7/2009 | Tate et al. |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1* | 9/2009 | Becker ..................... A61F 9/06 348/82 |
| 2009/0236325 A1 | 9/2009 | Gozalbo |
| 2009/0249606 A1 | 10/2009 | Diez |
| 2009/0283021 A1 | 11/2009 | Wong |
| 2009/0298024 A1* | 12/2009 | Batzler .................... B23K 9/32 434/234 |
| 2009/0313549 A1 | 12/2009 | Casner |
| 2009/0323121 A1 | 12/2009 | Valkenburg |
| 2010/0020483 A1 | 1/2010 | Ma |
| 2010/0048273 A1 | 2/2010 | Wallace |
| 2010/0062405 A1 | 3/2010 | Zboray |
| 2010/0062406 A1* | 3/2010 | Zboray ................ G09B 19/003 434/234 |
| 2010/0088793 A1 | 4/2010 | Ghisleni |
| 2010/0123664 A1 | 5/2010 | Shin |
| 2010/0133247 A1 | 6/2010 | Mazumder |
| 2010/0145520 A1 | 6/2010 | Gerio |
| 2010/0201803 A1 | 8/2010 | Melikian |
| 2010/0207620 A1 | 8/2010 | Gies |
| 2010/0224610 A1 | 9/2010 | Wallace |
| 2010/0238119 A1 | 9/2010 | Dubrovsky |
| 2010/0245273 A1 | 9/2010 | Hwang |
| 2010/0283588 A1 | 11/2010 | Gomez |
| 2010/0291313 A1 | 11/2010 | Ling |
| 2011/0006047 A1* | 1/2011 | Penrod ................. B23K 9/0956 219/137 R |
| 2011/0091846 A1* | 4/2011 | Kreindl .................... B23K 9/00 434/234 |
| 2011/0092828 A1 | 4/2011 | Spohn |
| 2011/0114615 A1 | 5/2011 | Daniel |
| 2011/0117527 A1 | 5/2011 | Conrardy |
| 2011/0183304 A1* | 7/2011 | Wallace ................. G09B 19/24 434/234 |
| 2011/0313731 A1 | 12/2011 | Vock |
| 2012/0007748 A1 | 1/2012 | Forgues |
| 2012/0037600 A1 | 2/2012 | Katoh |
| 2012/0072021 A1 | 3/2012 | Walser |
| 2012/0189993 A1* | 7/2012 | Kindig ................... G09B 19/24 434/234 |
| 2012/0205359 A1 | 8/2012 | Daniel |
| 2012/0298640 A1 | 11/2012 | Conrardy |
| 2013/0040270 A1* | 2/2013 | Albrecht .................. B23K 9/00 434/234 |
| 2013/0064427 A1 | 3/2013 | Picard et al. |
| 2013/0182070 A1 | 7/2013 | Peters |
| 2013/0183645 A1 | 7/2013 | Wallace |
| 2013/0189656 A1 | 7/2013 | Zboray |
| 2013/0189657 A1 | 7/2013 | Wallace |
| 2013/0189658 A1 | 7/2013 | Peters |
| 2013/0203029 A1 | 8/2013 | Choquet |
| 2013/0230832 A1 | 9/2013 | Peters |
| 2013/0252214 A1 | 9/2013 | Choquet |
| 2014/0042135 A1 | 2/2014 | Daniel |
| 2014/0042137 A1 | 2/2014 | Daniel |
| 2014/0134580 A1* | 5/2014 | Becker ..................... G09B 9/00 434/234 |
| 2014/0220522 A1 | 8/2014 | Peters |
| 2014/0234813 A1 | 8/2014 | Peters |
| 2014/0263227 A1 | 9/2014 | Daniel |
| 2014/0272836 A1* | 9/2014 | Becker ................... G09B 19/24 434/234 |
| 2014/0322684 A1 | 10/2014 | Wallace |
| 2014/0346158 A1 | 11/2014 | Matthews |
| 2015/0209887 A1 | 7/2015 | DeLisio |
| 2015/0328710 A1 | 11/2015 | Kachline |
| 2016/0203734 A1 | 7/2016 | Boulware |
| 2016/0203735 A1 | 7/2016 | Boulware |
| 2016/0236303 A1 | 8/2016 | Matthews |

FOREIGN PATENT DOCUMENTS

| | | |
|---|---|---|
| CA | 2549553 | 7/2004 |
| CA | 2554498 | 4/2006 |
| CN | 1264822 | 8/2000 |
| CN | 100371672 | 12/2004 |
| CN | 1841321 | 10/2006 |
| CN | 1866317 | 11/2006 |
| CN | 1909020 | 2/2007 |
| CN | 101218060 | 7/2008 |
| CN | 201181527 | 1/2009 |
| CN | 101502906 | 8/2009 |
| CN | 101770710 | 7/2010 |
| CN | 102083580 | 6/2011 |
| CN | 102165504 | 8/2011 |
| CN | 102165505 | 8/2011 |
| CN | 102298858 | 12/2011 |

(56) References Cited

FOREIGN PATENT DOCUMENTS

| | | | | |
|---|---|---|---|---|
| CN | 102441737 | 5/2012 | | |
| CN | 103038804 | 4/2013 | | |
| CN | 103071909 | 5/2013 | | |
| CN | 103143810 | 6/2013 | | |
| CN | 103392089 | 11/2013 | | |
| CN | 203276641 | 11/2013 | | |
| CN | 103831553 | 6/2014 | | |
| CN | 203778997 | 8/2014 | | |
| EP | 0323277 | 7/1989 | | |
| EP | 0878263 | 11/1998 | | |
| EP | 0963744 | 12/1999 | | |
| EP | 1029306 | 8/2000 | | |
| EP | 1295195 | 6/2001 | | |
| EP | 1573699 | 9/2005 | | |
| EP | 1797545 | 6/2007 | | |
| EP | 1864744 | 12/2007 | | |
| EP | 2022592 | 2/2009 | | |
| FR | 1456780 | 7/1966 | | |
| FR | 2827066 | 1/2003 | | |
| GB | 2454232 | A | 5/2009 | |
| GB | 2454261 | A * | 5/2009 | G09B 19/24 |
| JP | H1146387 | 5/1999 | | |
| JP | 2000298427 | 10/2000 | | |
| JP | 2002317557 | 10/2002 | | |
| JP | 2004181493 | 7/2004 | | |
| JP | 2007021542 | 2/2007 | | |
| JP | 2009125790 | 6/2009 | | |
| KR | 100876425 | 12/2008 | | |
| KR | 20110000152 | 1/2011 | | |
| SU | 846203 | 7/1981 | | |
| SU | 972552 | 11/1982 | | |
| SU | 1324050 | 7/1987 | | |
| SU | 1354234 | 11/1987 | | |
| SU | 1489933 | 6/1989 | | |
| SU | 1638145 | 3/1991 | | |
| WO | 9958286 | 11/1999 | | |
| WO | 03019349 | 1/2003 | | |
| WO | 2004057554 | 7/2004 | | |
| WO | 2005102230 | 11/2005 | | |
| WO | 2005110658 | 11/2005 | | |
| WO | 2006004427 | 1/2006 | | |
| WO | 2006034571 | 4/2006 | | |
| WO | 2007009131 | 1/2007 | | |
| WO | 2007044135 | 4/2007 | | |
| WO | 2008076777 | 6/2008 | | |
| WO | 2009022443 | 2/2009 | | |
| WO | 2009053829 | 4/2009 | | |
| WO | 2009060231 | 5/2009 | | |
| WO | 2009092944 | 7/2009 | | |
| WO | 2010000003 | 1/2010 | | |
| WO | 2010020867 | 2/2010 | | |
| WO | 2010020869 | 2/2010 | | |
| WO | 2010020870 | 2/2010 | | |
| WO | 2010111722 | 10/2010 | | |
| WO | 2013061518 | 5/2013 | | |
| WO | 2013186413 | 12/2013 | | |
| WO | 2014074297 | 5/2014 | | |

OTHER PUBLICATIONS

Canadian Office Action Appln No. 2,961,806 dated Jan. 8, 2018 (3 pgs).
"NJC Technology Displayed at ShipTech 2005", Welding Journal, vol. 84, No. 3, Mar. 2005, p. 54, https://app.aws.org/w/r/www/wj/2005/03/WJ_2005_03.pdf.
"Sheet Metal Conference XXII," Conference Program, American Welding Society, May 2006, Detroit.
"Virtual Reality Program to Train Welders for Shipbuilding", American Welding Society, Navy Joining Center, https://app.aws.org/wj/2004/04/052/.
"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.
"Virtual Welding—A Low Cost Virtual Reality Welder Training System", Interim Status Report #4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.
"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.
"Vision for Welding Industry," American Welding Society, Apr. 22, 1999, http://www.aws.org/library/doclib/vision.pdf.
"Welding in Defense Industry," American Welding Society conference schedule, 2004. https://app.aws.org/conferences/defense/live_index.html.
"Welding Technology Roadmap," prepared by Energetics, Inc., Columbia, MD, in cooperation with The American Welding Society and The Edison Welding Institute, Sep. 2000.
123arc.com—"Weld into the future"; 2000.
Advance Program of American Welding Society Programs and Events, Nov. 11-14, 2007, Chicago.
Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.
Aiteanu, Dorin, et al., "A Step Forward in Manual Welding: Demonstration of Augmented Reality Helmet," Institute of Automation, University of Bremen, Germany, 2003.
Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).
American Welding Society Forms: typical Procedure Qualification Record and Welding Procedure Specification forms.
ArcSentry Weld Monitoring System, Version 3, Users Manual, Native American Technologies, Golden, CO, Dec. 10, 1999.
Arvika Forum Vorstellung Projeckt PAARA, BMW Group Virtual Reality Center, Nuernberg, 2003.
Ascension Technology Corporation: Tracking 3D Worlds: http://ascension-tech.com/, Dec. 1996.
Barckhoff, J.R.; "Total Welding Managemet," American Welding Society, 2005.
Bender Shipbuilding and Repair, Co., "Virtual Welding—A Low Cost Virtual Reality Welder Training System", Technical Proposal, Jan. 23, 2008.
Central Welding Supply http://www.welders-direct.com/ Feb. 29, 2000.
Choquet, Claude, ARC+: Today's Virtual Reality Solution for Welders, Jun. 1, 2008.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19-22, 2007.
Fast et al., Virtual Training for Welding, Proceedings of the Third IEEE and ACM International Symposium on Mixed and Augmented Reality (ISMAR 2004); 0-7695-2191-6/04; 2004.
Fridenfalk et al., Design and Validation of a Universal 6D Seam Tracking System in Robotic Welding Based on Laser Scanning, Industrial Robotics: Programming, Simulation, and Application, ISBN 3-86611-286-6, pp. 702, ARS/plV, Germany, Dec. 2006, edited by Kin Huat.
Fronius "The Ghost": http://www.fronius.com/cps/rde/xchg/SID-3202EAB7-AE082518/fronius_interational/hs.xsl/79_15490_ENG_HTML.htm; 2006.

(56) References Cited

OTHER PUBLICATIONS

Fronius International GmbH—Focus on Welding—Fronius Virtual Welding; http://www.fronius.com/cps/rde/xchg/SID-99869147-0110E322/fronius_intenational/hs.xsl/79_15490_ENG_HML.htm; 2006.
ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Hasser (1995, 1996).
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hashimoto, Nobuyoshi et al., "Training System for Manual Arc Welding by Using Mixed Reality: Reduction of Position-Perception Error of Electrode Tip," Journal of the Japan Society for Precision Engineering, vol. 72, pp. 249-253, 2006.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," Fabtech International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.
Hillers, Bernd, Dorin Aiteanu, Axel Graser, "Augmented Reality—Helmet for the Manual Welding Process," Virtual and Augmented Reality Applications in Manufacturing, Institute of Automation, Universtity of Bremen, 2004.
Himperich, Frederick, "Applications in Augmented Reality in the Automotive Industry," Fachgebiet Augmented Reality, Department of Informatics, Jul. 4, 2007, p. 1-21.
http://www.123arc.com "Simulation and Certification"; 2000.
Integrated Microelectromechanical Gyroscopes; Journal of Aerospace Engineering, Apr. 2003 pp. 65-75 (p. 65) by Huikai Xie and Garry K. Fedder.
International Search Report for PCT application No. PCT/US2013/038371, dated Jul. 31, 2013, 8 pgs.
International Search Report for PCT application No. PCT/US2013/066037, dated Mar. 11, 2014, 10 pgs.
International Search Report for PCT application No. PCT/US2013/066040, dated Mar. 11, 2014, 12 pgs.
International Search Report for PCT application No. PCT/US2014/018107, dated Jun. 2, 2014, 3 pgs.
International Search Report for PCT application No. PCT/US2014/018109, dated Jun. 2, 2014, 4 pgs.
International Search Report for PCT application No. PCT/US2014/018113, dated Jun. 2, 2014, 3pgs.
International Search Report for PCT application No. PCT/US2014/018114, dated Jun. 2, 2014, 4 pgs.
International Search Report for PCT application No. PCT/US2014/065498, dated May 11, 2015, 13 pgs.
International Search Report for PCT application No. PCT/US2014/065506, dated Jun. 26, 2015, 16 pgs.
International Search Report for PCT application No. PCT/US2014/065512, dated Jun. 8, 2015, 17 pgs.
International Search Report for PCT application No. PCT/US2014/065525, dated Jul. 23, 2015, 16 pgs.
International Search Report for PCT application No. PCT/US2014/067951, dated Feb. 24, 2015, 10 pgs.
International Search Report for PCT application No. PCT/US2015/037410, dated Nov. 6, 2015, 10 pgs.
International Search Report for PCT application No. PCT/US2015/037439, dated Nov. 3, 2015, 12 pgs.
International Search Report for PCT application No. PCT/US2015/037440, dated Nov. 3, 2015, 12 pgs.
International Search Report for PCT application No. PCT/US2015/039680, dated Sep. 23, 2015, 12 pgs.
International Search Report from PCT application No. PCT/US2014/018103, dated Jun. 30, 2014, 13 pgs.
International Search Report from PCT application No. PCT/US2015/043370, dated Dec. 4, 2015, 12 pgs.
International Search Report from PCT application No. PCT/US2015/058563, dated Jan. 29, 2016, 13 pgs.
International Search Report from PCT application No. PCT/US2015/058567, dated May 6, 2016, 15 pgs.
International Search Report from PCT application No. PCT/US2015/058569, dated Feb. 10, 2016, 12 pgs.
International Search Report from PCT application No. PCT/US2015/058660, dated Feb. 2, 2016, 14 pgs.
International Search Report from PCT application No. PCT/US2015/058664, dated Apr. 25, 2016, 17 pgs.
International Search Report from PCT application No. PCT/US2015/058666, dated Feb. 1, 2016, 11 pgs.
International Search Report from PCT application No. PCT/US2015/058667, dated Feb. 5, 2016, 14 pgs.
International Search Report from PCT application No. PCT/US2016/023612, dated Jul. 18, 2016, 11 pgs.
Kobayashi, Kazuhiko et al., "Modified Training System for Manual Arc Welding by Using Mixed Reality and Investigation of Its Effectiveness," Journal of the Japan Society for Precision Engineering, vol. 70, pp. 941-945, 2004.
Kobayashi, Kazuhiko et al., "Simulator of Manual Metal Arc Welding with Haptic Display," Chiba University, ICAT 2001, Dec. 2001.
Kobayashi, Kazuhiko et al., "Skill Training System of Manual Arc Welding by Means of Face-Shield HMD and Virtual Electrode," Chiba University, Japan, R. Nakatsu et al. (eds.), Entertainment Computing, Springer Science+Business Media, New York, 2003.
Lincoln Electric VRTEX Virtual Reality Arc Welding Trainer; http://www.lincolnelectric.com/en-us/equipment/training-equipment/pages/vrtex360.aspx; 1999.
NAMeS Users Guide, N A Tech Neural Applications, Copyright 1997, 1998, 1999, 2000 Golden, CO (123 pages).
NAMeS, Native American Technologies Weld Measuring Software, Users Guide, 2000.
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "Process Improvement Products" web page, http://web.archive.org/web/20020608050736/http://www.natech-inc.com/products.html, published Jun. 8, 2002.
Natural Point, Trackir; http://www.naturalpoint.com/trackir/, Dec. 2003.
Numerical Simulation F Arc Welding Process and its Application Dissertation for Ohio State University by Min Hyun Cho, M.S. 2006: See Internet as this document is security protected) ohttps://etd.ohiolink.edu/ap:0:0:APPLICATION_PROCESS=DOWNLOAD_ETD_SUB_DOC_ACCNUM:::F1501_ID:osu1155741113, attachment.
OptiTrack: Motion Capture Systems: http://www.naturalpoint.com/optitrack/, Mar. 2005.
Penrod, Matt; "New Welder Training Tools," EWI PowerPoint presentation, 2008.
PhaseSpace: Optical Motion Capture: http://phasespace.com/, 2009.
Polhemus: Innovation in Motion: http://polhemus.com/?page=researchandtechnology, 1992.

(56) References Cited

OTHER PUBLICATIONS

Porter et al, EWI-CRP Summary Report SR0512, Jul. 2005—Virtual Reality Welder Training.
Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS, http://www.nsrp.org/6-Presentations/WD/Virtual_Welder.pdf.
Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications; 2007.
Quebec International, May 28, 2008 'Video Game' Technology to Fill Growing Need; http://www.mri.gouv.qc.ca/portail/_scripts/actualities/viewnew.sap?NewID=5516.
Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.
ShotOfFuel; Wii Head Tracking for 3D, http://www.youtube.com/watch?v=1x5ffF-0Wr4, Mar. 19, 2008.
Terebes; miscellaneous examples from http://www.terebes.uni-bremen.de.
The Rutgers Master II—New Design Force-Feedback Glove by Mourad Bouzit, Member, IEEE,Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
thefabricator.com—Arc Welding Article; Heston, Tim, Virtual welding—Training in a virtual environment gives welding students a leg up—Mar. 11, 2008.
Tschirner, Petra, Hillers, Bernd, and Graeser, Axel; "A Concept for the Application of Augmented Reality in Manual Gas Metal Arc Welding," Proceedings of the International Symposium on Mixed and Augmented Reality, 2002.
Vicon: Motion Capture Systems: http://vicon.com/, Dec. 1998.
Virtual Reality Training Manual Module 1—Training Overview—A Guide for Gas Metal Arc Welding—EWI 2006.
VRTEX 360, Lincoln Electric, Dec. 2009.
Welding Journal, American Welding Society, Nov. 2007, https://app.aws.org/wj/2007/11/WJ_2007_11.pdf.
International Search Report for PCT application No. PCT/US2009/045436, dated Nov. 9, 2009, 3 pgs.
International Search Report for PCT application No. PCT/US2012/050059, dated Nov. 27, 2012, 16 pgs.
Aiteanu, Dorin, "Virtual and Augmented Reality Supervisor for a New Welding Helmet" Nov. 15, 2005, pp. 1-150.

\* cited by examiner

WELDING TRAINING SYSTEM

CROSS-REFERENCE TO RELATED APPLICATIONS

This application is a continuation application of U.S. non-provisional application Ser. No. 12/473,392 filed May 28, 2009, which claims the benefit of U.S. provisional application 61/056,696 filed May 28, 2008, both of which are hereby incorporated by reference in their entireties.

BACKGROUND

The mechanical quality of an arc weld is a function of many complex variables, and can vary significantly depending on the skill of the operator. It is, therefore, very important for welding operators to be trained in welding processes and control. Training welders to provide a quality weld, however, can be a very time consuming process. Typical training programs are long, expensive, and inefficient. These programs, moreover, require personal hands-on instruction, and the number of instructor necessary is also problematic.

Due to the need to simplify and improve training, virtual reality (VR) trainers have been developed. In these systems, the operator does not strike an arc, but rather receives guidance from an instructor or the welding system in a "virtual" system, of the type typically found in the PC gaming industry. These systems can be either "virtual reality" and/or "augmented reality" systems. In 'virtual reality', the reality of the operator is completely replaced, typically through the use of helmet or other enclosure, with a computer-generated environment that visually represents the new environment. This can be extended with additional sensors and actuators to coordinated forces applied in conjunction with the visual reality to enhance the virtual experience. In 'augmented reality', portions of the operator's senses may be overridden with computer-generated data, which can include, for example, graphic images. The technology to create sensation, or constrain movement also falls into this category.

SUMMARY OF THE INVENTION

The present invention uses real welding and feedback to the operator to train an operator, or a combination of real and simulated welding experiences, as opposed to solely simulated or virtual training.

In this invention, a 'closed-loop' feedback mechanism is provided with the welding trainee 'in the loop'. By measuring the movements of trainee and then feeding back a signal in such a way as to encourage the trainee to compensate in the proper direction, an environment can be created where proper hand-eye coordination and muscle-memory is learned, both in a simulated and real-arc scenario.

This invention gives the operator the ability to learn faster in a real arc situation, but also tries to help the operator as if the teacher is with the student, when, in reality, the teacher is not. Therefore, fewer instructors are required.

In one aspect of the invention, a device for use by a welding operator while performing a weld is provided. The welding operator device includes a controller, a position sensor providing position feedback data to the controller, and a position feedback indicator operatively coupled to the controller. The controller is programmed to receive position data from the position sensor, to determine a position of at least one of a welding operator performing a weld and an angle of the weld, and to activate the position indicator to provide feedback to the welding operator to correct a welding parameter during a weld. In some applications, the welding operator device can include a communications device for communicating position feedback data to at least one of a welding power source and a welding network.

In another aspect of the invention, the position sensor can be an angle sensor or an altimeter. The position sensor can be, for example, a global positioning sensor, a gyroscopic sensor, an accelerometer, and a micro-electromechanical gyroscope. The position indicator can be a visual feedback device, an audio feedback device, and a tactile feedback device. A visual feedback device can include, for example, an LCD, LED, or OLED display. The tactile feedback device can comprise a vibrational motor, a piezeo-electric device, weighted rotating cam, an air bladder, and an exoskeleton. A plurality of tactile feedback devices can be located on the welding operator device to provide a directional feedback signal to the operator.

In another aspect of the invention, the welding operator device can be a welding gun, a welding glove, or a wristband worn by the welding operator. Alternatively, the welding operator device can comprise an eye shield for shielding the operator's eyes during a weld, such as a welding helmet or eye goggles.

In yet another aspect of the invention, a welding system is provided including a welding power source for providing welding power to the weld, which includes a power source controller and a power source communications device. A welding operator device is in communication with the power source communications device in the welding power source, and includes a position feedback sensor, an operator indicator, and a communications device operatively coupled to the position feedback sensor and the operator indicator. The communications device in the welding operator device provides position feedback data to the welding power source controller, and the welding power source controller is programmed to evaluate the position feedback and to activate the operator indicator when the position feedback is outside of a predetermined range.

In another aspect of the invention, the welding system can include at least one weld position locator device. The weld position locator device comprises a position sensor operatively coupled to a weld position communications device, that is positionable adjacent a part to be welded. The communications device provides weld position feedback data from the position sensor to the welding power source for use in evaluating the position of the weld.

In another aspect of the invention, the welding operator device can be a protective eye shielding device, a welding gun, a glove, and or wrist band. The system can also include a second welding operator device that provides position feedback data to the welding power source, and the second welding operator device can be a protective eye shielding device, a welding gun, a glove, or a wrist band.

In still another aspect of the invention, a welding gun is provided including a position sensor, a controller, and a tactile feedback device. The controller is programmed to receive feedback from the position sensor, and to activate the tactile feedback device when the feedback indicates that the position of the welding operator device is outside of a predetermined range. The position sensor can be at least one of an angle sensor and an altimeter. The tactile feedback device can be one or more of a vibrational motor, a piezeo-electric device, and an air bladder. The welding gun can include a plurality of tactile feedback devices located at a corresponding plurality of positions around the gun or a handle of the welding gun, and the controller can be programmed to selectively activate one or more of the plurality of tactile devices to provide a directional feedback signal to a welding operator during a weld.

In still another aspect of the invention, a welding glove is provided including a position sensor, a controller, and a tactile feedback device. The controller is programmed to receive feedback from the position sensor, and to activate the tactile feedback device when the feedback indicates that the position of the welding operator device is outside of a predetermined range. The position sensor can be at least one of an angle sensor and an altimeter. The tactile feedback device can be one or more of a vibrational motor, a piezoelectric device, and an air bladder. The gun can include a plurality of tactile feedback devices located at a corresponding plurality of positions around the welding glove, and the controller can be programmed to selectively activate one or more of the plurality of tactile devices to provide a directional feedback signal to a welding operator during a weld.

In another aspect of the invention, a welding system is provided including a welding power source for providing welding power to a weld, and including a power source controller and a power source communications device. The system also includes a first welding operator device in communications with the power source communications device in the welding power source, and including a position feedback sensor, and a communications device operatively coupled to the position feedback sensor. A second welding operator device is also provided in communication with the welding power source, and including an operator indicator, and a communications device operatively coupled to the operator indicator. The communications device in the first welding operator device provides position feedback data to the welding power source controller, and the welding power source controller is programmed to evaluate the position feedback and to communicate a signal to the communications device in the second welding operator device to activate the operator indicator when the position feedback is outside of a predetermined range. In another aspect of the invention, the first welding operator device is at least one of a welding gun and a welding glove. The second welding operator device can be or include a protective eye shield.

In still another aspect of the invention, a welding power source is provided comprising a welding power supply for conditioning raw power for a welding-type process, a controller, and a communications device in communication with the controller and one or more peripheral devices configured to provide position feedback relevant to a quality of the welding-type process, wherein the controller is programmed to receive the position feedback, compare the position feedback to stored data, and to provide a signal to a weld operator when the position feedback is outside of a predetermined range. The controller can further be programmed to selectively provide an actual weld where the position data is monitored and stored data during a weld and a simulated welding-type process where the position feedback is monitored and compared to stored data without starting an arc.

These and still other advantages of the invention will be apparent from the description which follows. In the detailed description below, the preferred embodiment of the invention will be described in reference to the accompanying drawings. This embodiment does not represent the full scope of the invention. Rather the invention may be employed in other embodiments. Reference should therefore be made to the claims herein for interpreting the breadth of the invention.

DETAILED DESCRIPTION OF THE INVENTION

The present invention will be described with respect to a power source for a MIG or Gas Metal Arc Welding (GMAW) system, and with reference to a gun feeding weld wire. One skilled in the art will appreciate however, that the present invention is applicable with power sources for other types of welding systems such as stick welding and TIG welding systems, and could also be applied to other welding-type systems such as induction heaters and plasma cutters. Furthermore, the term gun as used herein is intended to include both wire feed guns and other types of welding and plasma cutting torches.

Figure 1:
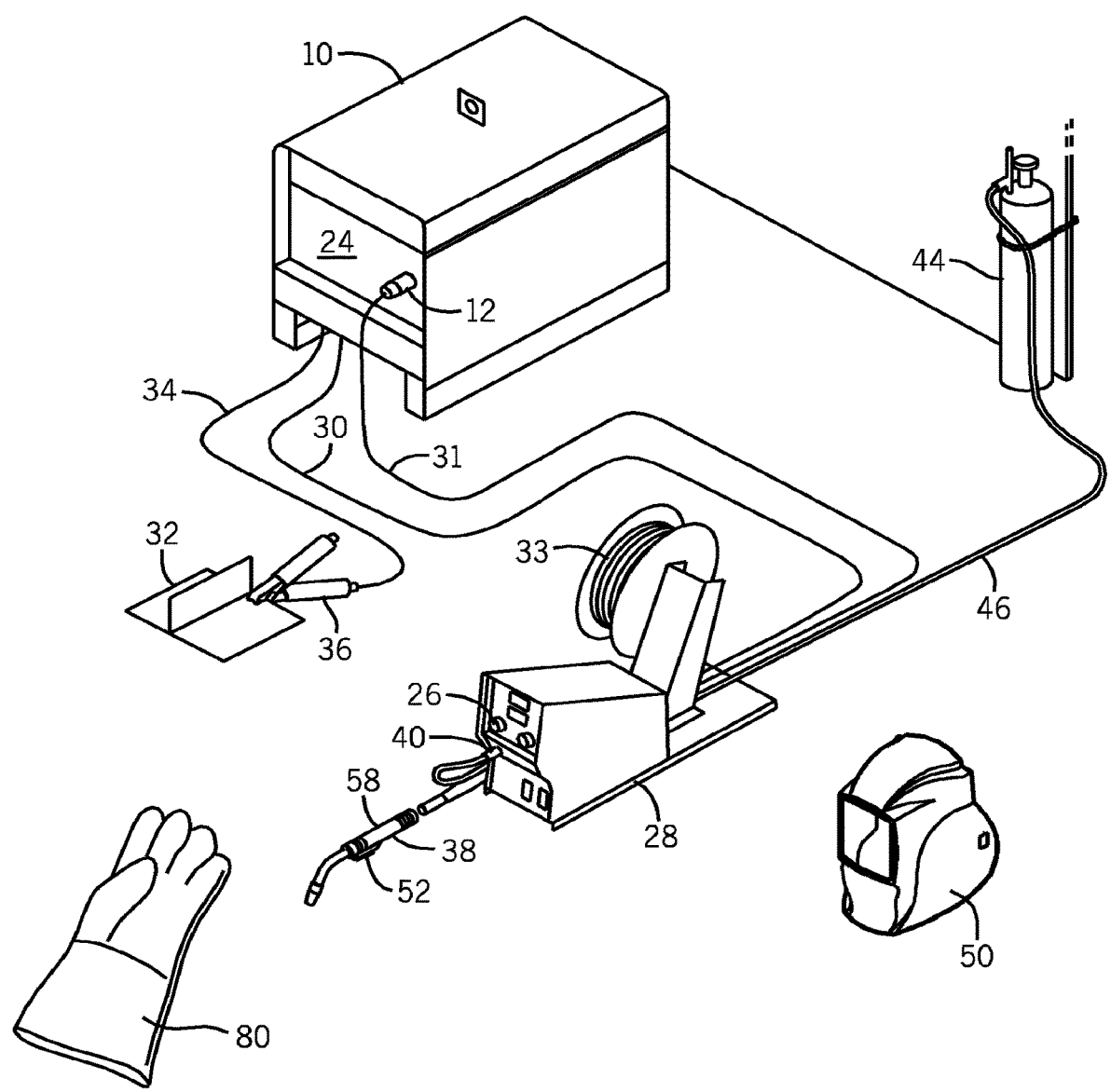
FIG. 1 is a view of a welding power source and associated components for performing a welding operation in accordance with the present invention.

Referring now to FIG. 1, a welding power source 10 designed to supply raw power that, when conditioned, is usable for a welding-type process is shown. For MIG welding applications, power source 10 is connected to a wire feeder 28 designed to present a consumable wire electrode 33 to the weld via a MIG gun 38. The power source 10 is connected to the wire feeder 28 via a weld cable 30 and to a work piece 32 via negative weld cable 34. A clamp 36 electrically connects an end of negative weld cable 34 to the work piece 32. Gun 38 is connected to the wire feeder via a connecting plug 40, and the wire feeder 28 is connected to a connector 12 on the control panel 24 of the power source 10 through a control cable 31. A gas cylinder 44 provides shielding gas to the wire feeder for use during the welding process through gas hose 46. The wire feeder 28 can include controls 26 for controlling, for example, wire feed speed and voltage. Similar controls (not shown) can be provided on the control panel 24 of the welding power source 10. A welding helmet 50 including a protective mask and a welding glove 80 are worn by the operator, and can be in communication with any of the components in the welding system to provide feedback to the weld operator, as described below.

Figure 8:
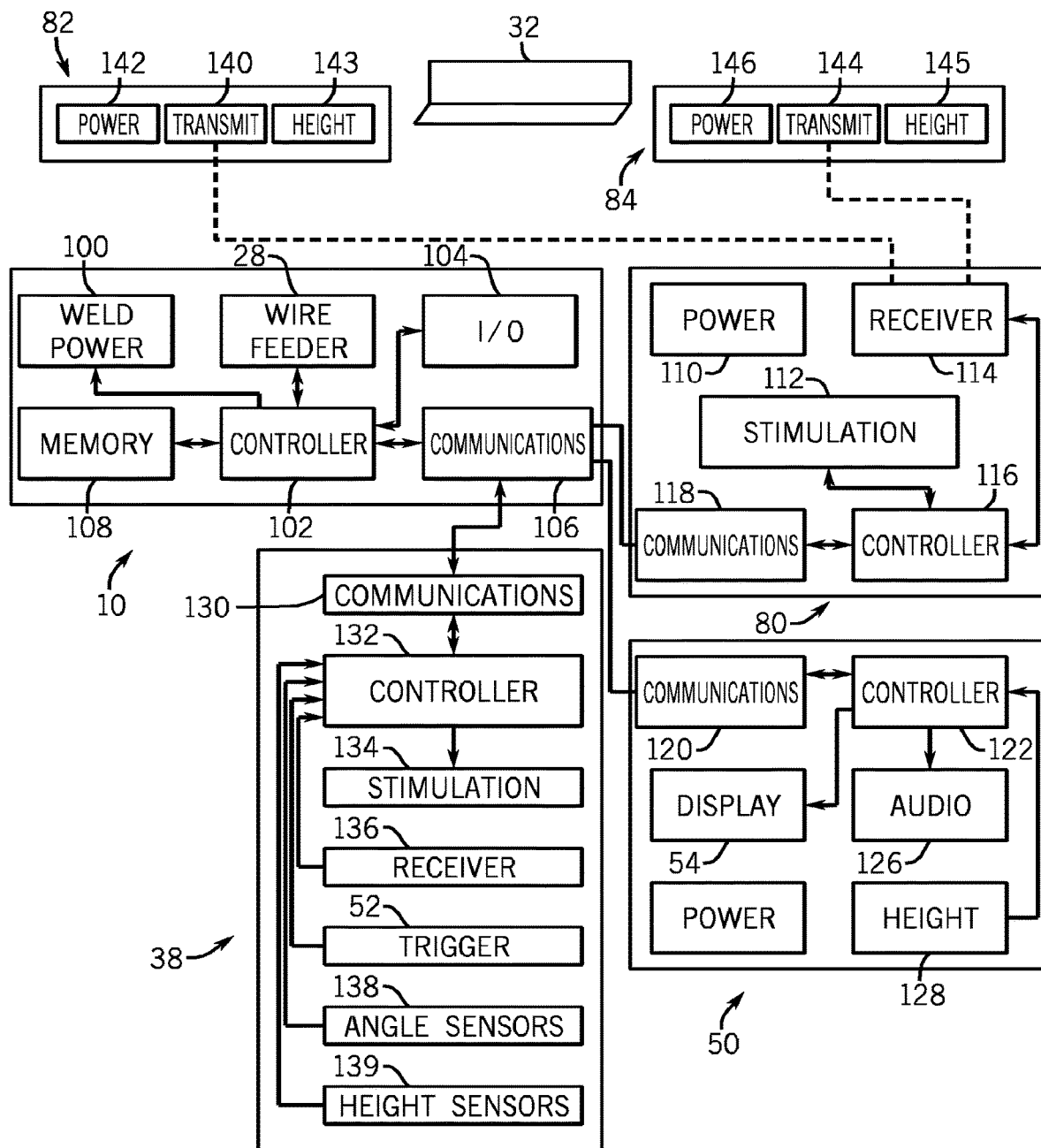
FIG. 8 is a simplified block diagram of the electronic components of FIG. 1.

Referring still to FIG. 1 and now also to FIG. 8, a block diagram of the components of the welding system described above is shown. In the block diagram, position feedback devices, including weld position sensors and height sensors are shown as associated with one or more of the welding power source 10, and welding operator devices including the gun 38, glove 80, and helmet 50. The components of the system are also shown as including individual controllers and communication devices. It will be apparent to one of ordinary skill, however, that all of the sensor, controller and communication devices shown here will not be necessary in all applications, and that duplicative sensors and devices can be positioned in one or more of the welding power source and associated external components. In addition, where a separate memory component is not shown below, it is assumed that a memory component is available, either as part of a controller or as a separate component in the device.

Referring now specifically to FIG. 8, the welding power source 10 includes a controller 102 for controlling a welding power supply 100 that conditions raw power for a welding-type process. The controller 102 is in further communication with a memory component 108, and a communications device 106 which can be either a wired or wireless communications system, and that communicates with at least one of the gun 38, helmet 50, and glove 80. The controller 102 can also be connected to a user interface, here shown as an input/output device 104, which can include a series of switches, a keyboard, an interactive display, or a combination of such devices. Optionally, the controller 102 controls an integrated wire feeder 28. Although, for simplicity, the wire feeder 28 is shown here as integral with the power supply 10, as described and shown above, the wire feeder 28 can be a separate component, and can include a separate controller and a communications device that can be in communications with the other components of the system. Furthermore, although the user interface 104 is shown as part of the power supply 10, the user interface could also be provided on the power source 10, wire feeder 28, gun 38, helmet 50 or in an external device in communication with any of these weld system components. Although not shown here, additional feedback devices including visual and audio alert or alarm devices, can also be provided on the welding power source, or in an external wire feeder.

Referring still to FIG. 8, weld position locator devices 82 and 84 can be coupled at opposing ends of a weld or spaced along the weld to provide linear position feedback to the operator/trainee. The weld position locator devices 82 and 84 can include, for example, transmitters 140 and 144, respectively, that transmits an RF or other signal that is read by a receiver, which can be in the gun 38 (receiver 136), in the glove 80 (receiver 114), or associated elsewhere in the system. The strength of the received signal can be used to determine at least a linear position of the weld, and to calculate a weld travel speed, as described below. The weld position locator devices 82 and 84 can include power sources 142 and 146, such as batteries, or can be connected to and powered from the welding power source 10, and also height sensors 141 and 143, although height sensing can also be determined from the transmitters 140 and 144 in some applications, and a separate sensor is not necessary. Although two weld position locator devices 82 and 84 are shown here, it will be apparent that one, or a plurality of weld position locator devices, can also be used. In particular, the number of weld locator devices can be selected based on the expected length of the weld and the strength of the transmitted signal.

Referring still to FIG. 8 and also to FIG. 1, the welding operator devices, including the welding helmet 50, glove 80, and gun 38, can be in communication with each other and with the power source 10, such that feedback regarding the weld can be transmitted to the operator/trainee during the weld, as described below. Communications between the helmet 50, glove 80, gun 38 and other components in the welding system are preferably wireless, although these devices can communicate through conventional wired communications systems, by transmitting signals through the weld cables, or in other methods known in the art.

Referring still to FIGS. 1 and 8, the gun 38 includes a trigger 52 which, when activated, provides a signal to the wire feeder 28 to drive the consumable wire electrode to the work piece 32, and a signal to the power source 10 to activate a contactor providing welding power to the weld cables 30. The gun 38 can optionally include one or more sensors for locating the position of the gun during a weld, including an angle sensor 138, a receiver 136 for determining a linear position of the gun 38 as it moves along a weld, and a height sensor 139 to provide feedback regarding the height of the weld. The gun 38 can also include at least one stimulation device 134 for providing feedback to a weld operator or trainee. The stimulation device 134 can be driven directly by the controller 102 in the power source 10, or by a controller 132 in the gun. The gun 38 can also include a communications device 130 for communicating with the power source 10, glove 80 or other components in the system.

Figure 2:
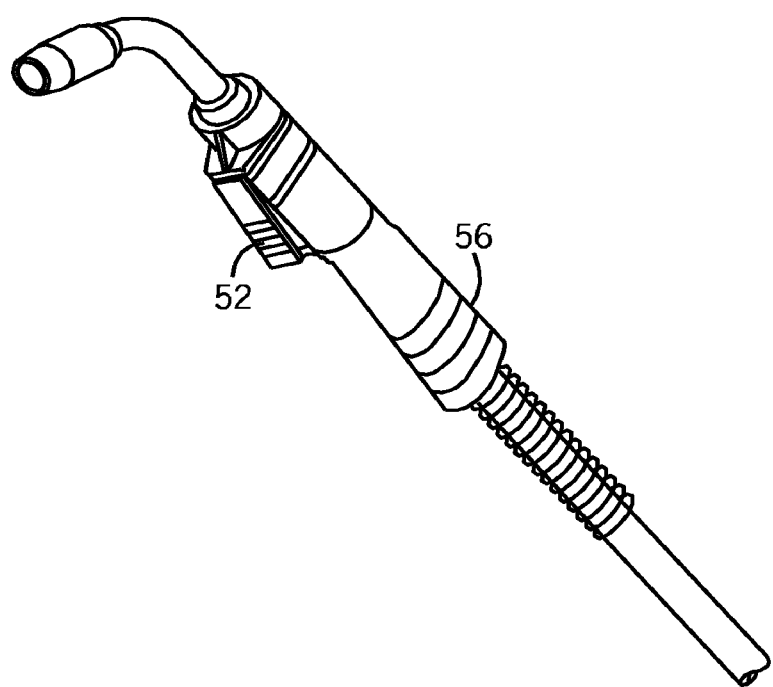
FIG. 2 is a perspective view of the welding gun of FIG. 1.

Referring still to FIGS. 1 and 8 and now also to FIG. 2, as described above, the gun 38 includes an angle sensor device 138 for sensing an angle of the tip of the gun 38 relative to the work piece 32, which can be provided, for example, inside the handle 56 of the gun 38, coupled to the handle 56, or closely spaced near the handle 56. The angle sensor device 138 can be, for example, a global positioning sensor, a gyroscopic sensor, a WAAS sensor, one or more accelerometers, a micro-electromechanical (MEMS) gyroscope or angular rate sensor, particularly of the type that senses motion in response to a Coriolis effect, or other devices. The gun 38 can communicate positional data to other components in the system through the connector 40, or through wireless communications as discussed above. When an angle sensor device 138 or any other weld position sensor is used, the trigger 52 can also provide a signal to acquire a "weld start" position based on data acquired from the GPS, positional network, or other sensor device, and store this position in memory in the gun 38, in the wire feeder 28, in the power source 10, or in all three locations. Alternatively, a mechanical alignment device could be provided at the start of the weld to align the gun in a "start position", which could then be stored in memory.

In another embodiment, the sensor device 138 can comprise multi-axis accelerometers which are used to determine the position of the torch and/or a glove. Multi-axis accelerometers sense angles such as the welding torch push or pull angle, and the angle of the torch with respect to the work being welded (the "torch angle"). The push, pull, and torch angles are determined and measured in multiple dimensions by comparing the orientation of the accelerometer with 'gravity vector' or acceleration due to the earth's gravity. As described above, the acquired angle data can be transmitted to other welding components in the welding system.

In an alternate embodiment, reflective material and corresponding light can be used to determine the position of the torch and the torch angle. In this application, the light used should be selected to be in a different light band that does not interfere with the welding arc to avoid interference. Another embodiment may include LEDs of various wavelengths on the gun or glove to show position independent of radiated light from the weld.

Referring still to FIGS. 2 and 8, to alert the operator to welding conditions, as described above, one or more stimulation device 134 can also be provided in the gun 38. The stimulation devices 134 can provide a pressure, vibration, or other signals to the operator. In one embodiment, a vibrational motor can also be provided inside a handle of the gun 38, or connected externally to a handle of the gun, to provide directional, tactile feedback to the operator during a weld to correct angle or motion due to vibration in an appropriate location communicating the type of correction needed. A suitable device is part number C1234B016F, available from Vibramotor.com. The position of the torch during welding can be compared to stored data, and the vibrational motor provided in or connected to the gun 38 can be activated to provide directional feedback to the operator indicating the appropriate direction to move the gun. Directional data could be provided, for example, by using a plurality of spaced vibrational motors within the gun handle, or by adjusting the frequency of the vibration to indicate different angle, directional, or travel speed changes. The intensity of the stimulation could also be correlated with a magnitude of error between a preferred or predetermined position and the actual position of the gun 38. Here, for example, the vibration of the motor would increase with the error, vibrating a little if the angle is slightly off, and more if the angle is significantly off. Vibration may also remain until the correction occurs.

Referring still to FIG. 8, the glove 80 can optionally include sensors for determining a position of the hand of the operator, distance from the weld, or other positional data, and a stimulation device 112 for providing feedback to the operator. A receiver 114, for example, can be in communications with weld position locator devices 82 and 84 positioned adjacent a weld associated with work piece 32 to determine the position of the gun 38 and glove 80 along an expected weld line. The glove 80 can also include a power supply 110, for powering the electronics associated with the glove 80. The power supply can be, for example, a battery, a solar-powered supply that is charged by light produced by the weld, an inductive power supply, or other types of power supplies. The power can also be drawn from the welding power source 10 and through a cable tethered to the gun 38. To provide control functions and communications to the welding power source 10 or other components in the weld system, a controller 116 or communications device 118 can also provided in the glove 80. The communication device 118 can, for example, transmit acquired data from the receiver 114 to the power source 10, and receive signals from the welding power supply 10 to control the stimulation devices 112. Although a feedback receiver 114 is shown here, it will be apparent that other types of angle sensors, height sensors, and other types of position sensors can also be incorporated in the glove 80 to provide positional feedback.

Referring again to FIGS. 1 and 8, the stimulation devices 112 in welding glove 80 can include a vibrational motor that vibrates or applies pressure to the hand of the operator in selected locations to tell the operator to tip, push or pull the gun differently. The stimulation can alternatively come from the vibration of piezo-electric devices positioned in the glove to provide a 'feel' sensation, from small air bladders that are pumped up, or from an exoskeleton that can apply pressure to the operator's hand in the glove. Although a welding glove 80 is shown here, as an alternative, the stimulation device or devices could also be provided in a wristband or in a specialized device coupled to the hand of a trainee weld operator.

Referring still to FIG. 8, the helmet 50 can include both sensors and feedback devices for providing feedback to an operator. Sensors in the helmet 50 can include, for example, an altimeter or height sensor 128 for providing feedback regarding the position of an operator's head while welding, or a series of position location sensors, such as global positioning sensors (GPS) that provide three dimensional feedback as the location of the helmet 50. Feedback can be provided to the operator using a display 54, audio device 126, or both. To provide communications to and from the welding power source 10 or other components in the weld system, the helmet 50 can include an internal controller 122 and a communications device 120. Although a welding helmet is shown, it will be apparent that welding goggles or other types of shielding devices could also be used.

Figure 3:
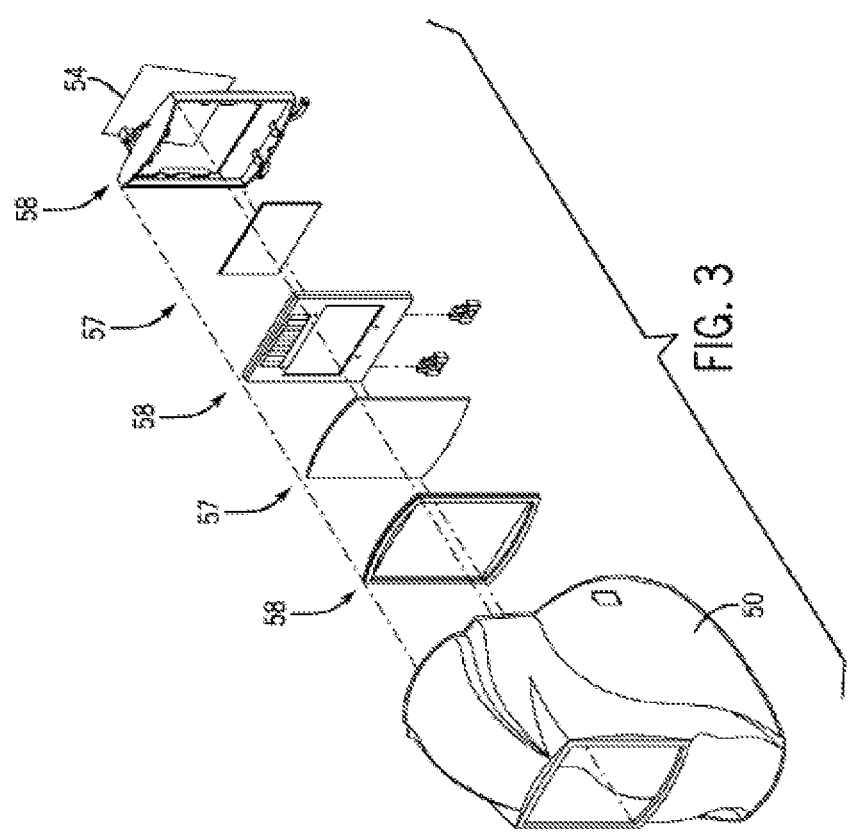
FIG. 3 is an exploded view of the helmet of FIG. 1.

Referring now also to FIG. 3, the communication device 120 in helmet 50 can receive torch angle and position feedback from the weld power source 10, gun 38, or glove 80 and helmet height feedback from the internal sensor 128. Based on this feedback, the controller 122 optionally drives a heads-up display 54 and audio device 126. The display 54 can be an LCD, LED, OLED laser projection, or other type of display, but is preferably a transparent organic light emitting diode (TOLED) display, and capable of providing graphic feedback indicating gun angle and gun travel speed feedback data to the operator. Since it is difficult to focus on a display placed close to the eyes, the display 54 can also include optics 57 (e.g., spaced throughout the helmet 50 via frame sections 58) to create the appearance that the display information is projected at a work distance (typically about eighteen inches) over the welder's view of the work area. To account for variations in operator height and head position, the helmet can be calibrated relative to the work piece to appropriately position weld feedback (such as a "ghost image" or "shadow") on the display. Calibration may be provided through a manual input to the user interface 104 on the power source 10, based on head height to work or automatically via height sensor 128 which can be an altimeter device or radar. Alternatively field strength from an RE transmitter or other device may determine the distance from head to work and intelligence in the control of the ghost signal will compensate from instructor to student or even from weld to weld for a given student as they move their head. During calibration, height of the helmet 50 can also be compared to height parameters associated with height sensors 139 in the gun or height sensors 141 and 143 associated with the weld position sensors 82 and 84. Although a helmet is shown and described here, it will be apparent that welding goggles, glasses, safety glasses or other types of shields could also be used.

To provide additional feedback to the operator, the helmet 50 can also include audio generation devices 126. For example, a headphone can be provided in the helmet, and audio feedback produced in response to the weld, or audio signals from an instructor, can be transmitted directly to the operator.

Referring again to FIG. 8, the torch position and weld travel speed sensor devices described above can be used during actual operation of a welding power source, and also to train the welder when not welding. For example, in one embodiment of the invention, a user can choose a "training mode" of operation through user interface 104 of power source 10. In the "training mode," activating the trigger 52 of gun 38 activates collection of gun or torch position and weld travel speed and position data, but does not activate wire feed, a weld contactor supplying weld power to the weld cables, gas, or coolants. Positional feedback is collected, and the appropriate stimulation device can be activated to provide feedback to the operator when necessary. When the operator is sufficiently proficient with movement of the weld gun, the power source 10 can be returned to a "weld" mode. A weld operator or trainee, therefore, can get guidance from an "instructor" without the instructor's continual presence, practice torch positioning without using expensive materials, and switch to an actual welding application when a predetermined level of proficiency is achieved.

Referring again to FIGS. 1, and 8 in one exemplary method of operation, an instructor or trainer initially performs a weld to be taught to student welders. The instructor begins by pulling the trigger 52 on gun 38, activating a weld. Upon receipt of the trigger signal, positional data is acquired from the angle sensor device 138 and position sensor devices 114 and 136 in the gun 38 or glove 80. As the instructor performs the weld, gun positional data and gun travel data is sampled or calculated at selected time periods, and stored in memory 108 of the power source 10. Other feedback data, such as voltage feedback, current feedback, wire stick out, travel speed, and wire feed speed feedback can also be saved. When the instructor is satisfied with the weld, the instructor can save these parameters as a "good weld" and activate feedback alarms for comparison to the feedback data in subsequent welds. The weld data can be stored, for example, in memory 108 of the power source 10, or elsewhere in the system, and later recalled as, for example, a weld program. Similar instructor guidance for proper motion may be saved in the simulation mode.

In alternative methods, "canned" programs could be stored in the memory 108 in the welding power source 10 or elsewhere in the weld system, and these programs could be recalled from memory by the instructor. These programs could, for example, be based on American Welding Society standards for specific weld types and joint configurations, which define gun angles, including a work angle, a push angle, and a pull or drag angle. The canned programs could, for example, be selectable between a butt weld, a tee weld, a lap joint, or other types of weld configurations for determining the position of the gun for a specific weld, specified by an operator from a user interface 104, as discussed above.

Figure 9:
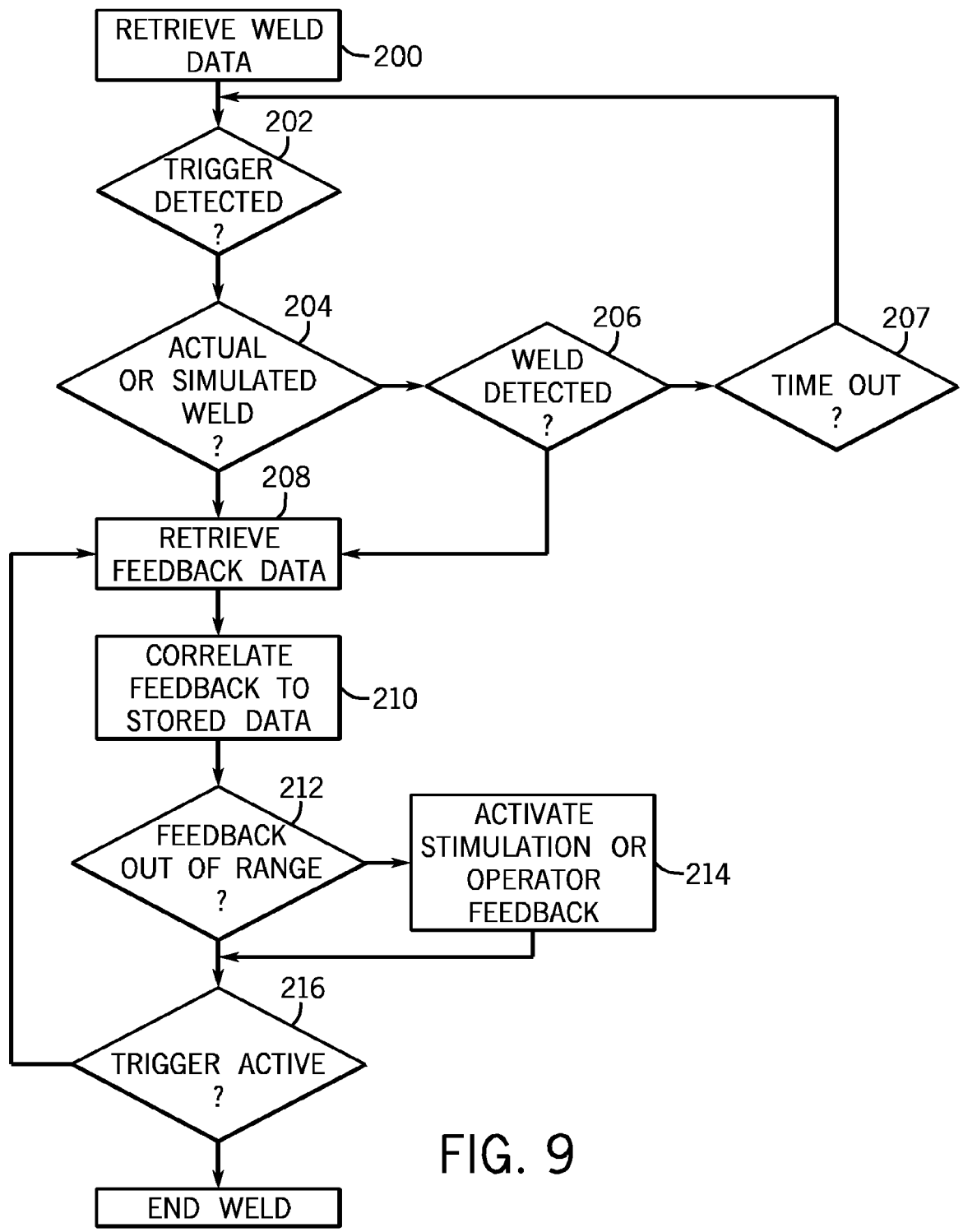
FIG. 9 is a flow chart illustrating the steps in a training process in accordance with the present invention.

Referring now also to FIG. 9, to train a weld operator, a student welder selects a stored weld to be performed as, for example, from the user interface 104 in the welding power source 10, and retrieves weld data from memory (step 200). The operator then begins a weld by activating the trigger 52 on the gun 38 (step 202). Preferably, as described above, the student has the option of selecting a "simulated" or an "actual" weld (step 204). The "simulated" or "actual" option may be stored in memory 108 as part of the program, or be individually selected from the user interface 104. When a weld is "actual", weld feedback data is acquired only after a weld is detected as a function of current feedback, or a combination of current and voltage feedback, as shown in FIG. 10 (steps 206 and 207).

Referring still to FIG. 9, as a weld is performed, weld feedback data is acquired (step 208) from the gun, glove, and weld position sensors described above, as well as from height sensors, to determine the position of the gun 38 or glove 80 (particularly, push, pull, and torch angles), and to determine a level of the helmet 50 as compared to the weld. Weld travel speed data can be calculated from the acquired data. Weld parameters, such as voltage, current, and wire feed speed, can also be monitored.

The acquired weld feedback data is compared to the stored data (step 210), and, when the gun position (push, pull, and torch angles), weld travel speed, or other parameters are out of a selected range (step 212), the operator receives feedback to reposition the gun or adjust the travel speed (step 214). The operator feedback can be visual or audio feedback provided through the helmet 50, or tactile feedback through the stimulation devices in the gun 38 or glove 80, and can be continued until the trigger is dropped (step 216) and the real or simulated weld is ended. The feedback can also be associated with a selected tolerance, such that a visual, tactile, or audio alarm is activated when the feedback parameters exceed the tolerance. The selected tolerance could be a pre-determined fixed value, a percentage, or a user-adjustable parameter. Hysteresis can also be provided in the tolerance to prevent the stimulation from flickering during borderline conditions. Here, the threshold would be adjusted based on the current status of the stimulation.

As described above, the sensors, controllers, and communications devices shown in the block diagram of FIG. 8 can be provided in various components in the weld system, and the configuration of the system can be varied based on application. In one embodiment, for example, the gun 38 includes a controller 132, communications device 130, angle sensor 138, receiver 136, and height sensor 139. In operation, the controller 132 compares acquired data to an ideal or expected position, and transmits operator feedback through the communications device 130 to one or more stimulation device 112 in the glove 80. Alternatively, data can be collected from one or more of sensor 138, receiver 136, and height sensor 140, and transmitted to the welding power source communications device 106. Here, the controller 102 in welding power source 10 compares the acquired data to data stored in memory 108, and communicates instructions to a stimulation device 112 (in glove 80) or 134 (in gun 38), providing operator feedback. Various other configurations will be apparent to those of ordinary skill in the art.

Figure 4:
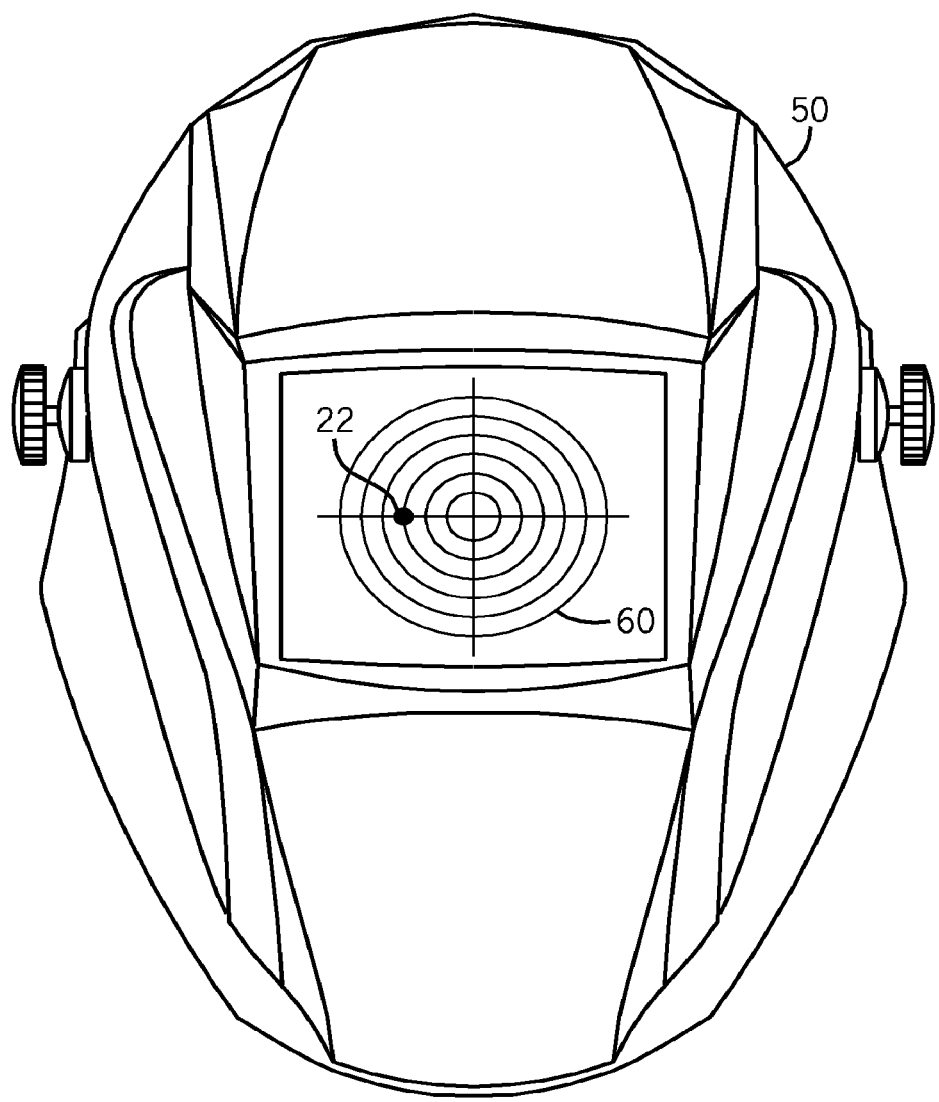
FIG. 4 is a front view of the helmet of FIG. 3, and illustrating a bullseye display.

Referring now to FIG. 4, in one embodiment of the invention, feedback to the user is provided through positional coordinate axes 10 on the lens of the welding helmet 50, welding goggles or glasses. These axes can be, as shown here, provided in a "bulls-eye" configuration. A series of latitudinal and longitudinal graphing lines, x/y coordinate axes or other symbols could also be used. The center of the coordinate system indicates the "desired position" of the gun. An actual location of the gun 62 can be displayed on the coordinate system. Based on this feedback, the operator can re-position the gun to an appropriate position. As described above, the height of the helmet is preferably calibrated for a specific operator, and the position of the gun or other "ghost image" provided on the display is appropriately positioned based on the height of the welder.

Figure 5:
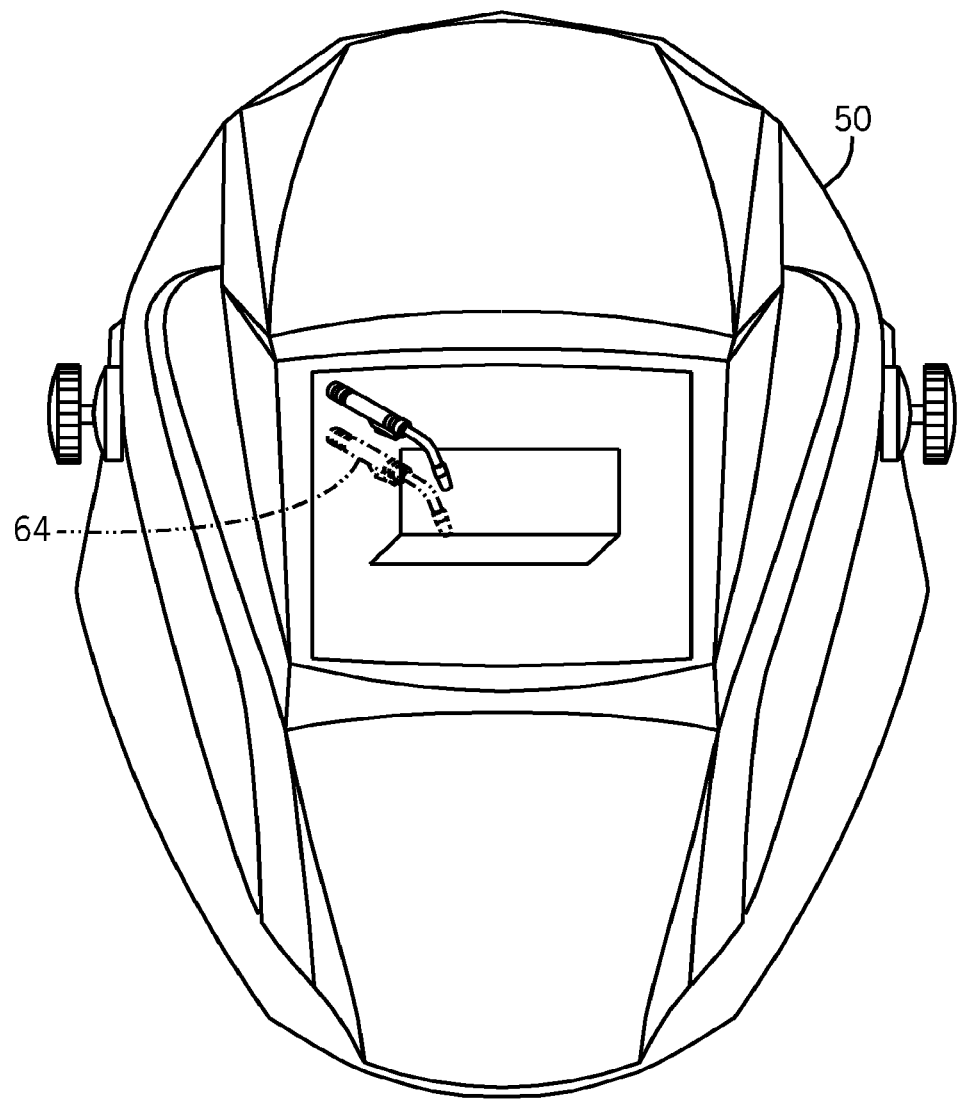
FIG. 5 is a front view of the helmet of FIG. 3 illustrating a ghost image of a gun on the helmet display.

Referring now to FIG. 5, in another embodiment of the invention, a "ghost" or "shadow" graphic of a weld gun 64 indicating the appropriate position and travel speed of the gun 38 as viewed from the helmet 50, or, in the alternative, welding goggles or glasses, can be provided. The "shadow" allows the operator to view both the actual position of the gun, and a desired position of the gun, enabling the operator to move the gun into alignment with the shadow when adjustment is necessary. Although a representation of the gun is shown here, it will be apparent that alignment lines and other directional indicators could also be used. Furthermore, to provide proper alignment of the viewing area of the helmet, angle and position sensors can also be integrated into the helmet. Using feedback from these sensors, the relative position of the helmet with respect to the torch can be calculated to appropriately position the "shadow".

Figure 6:
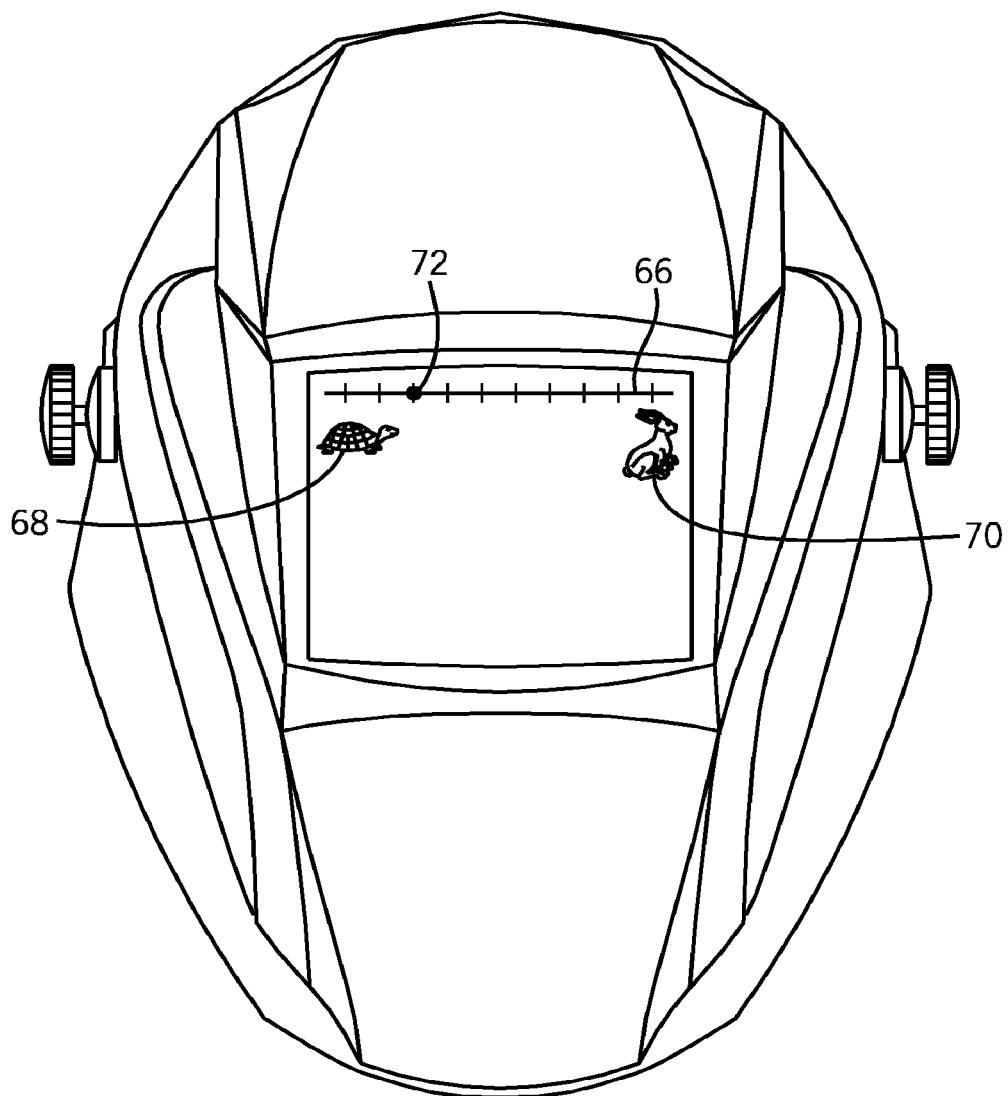
FIG. 6 is a front view of the helmet of FIG. 3 illustrating a weld travel speed gauge on the helmet display.
Figure 7A:
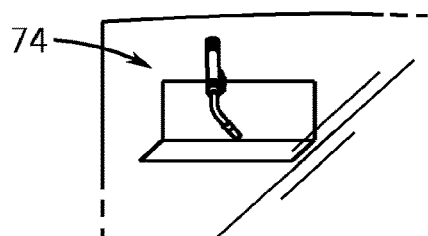
FIGS. 7 and 7A-7D illustrate a front view of the helmet of FIG. 3 illustrating a torch angle position correction images on the helmet display.
Figure 7:
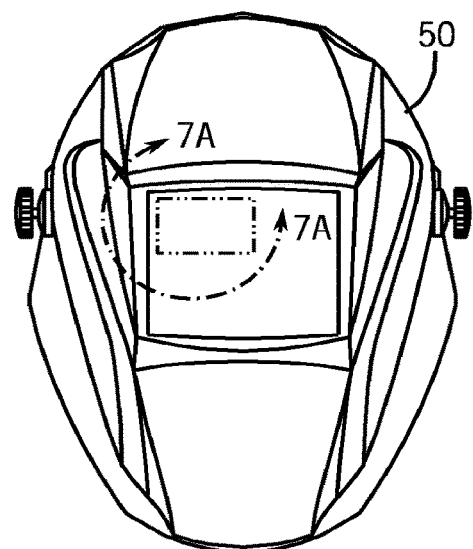
Figure 7B:
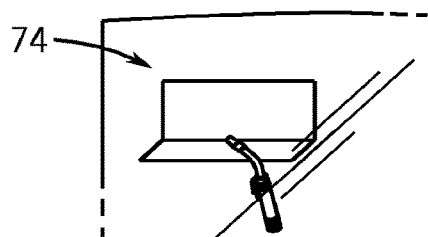
Figure 7C:
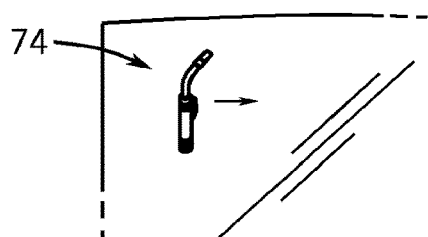
Figure 7D:
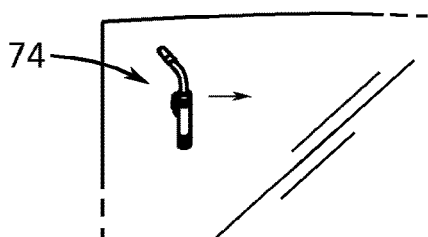

Referring now to FIG. 6, in another embodiment of the invention, a "travel speed" indicator 66 could be provided. As shown here, the travel speed indicator 66 could be a graphical speedometer extending between a "too slow" 68

(turtle) and a "too fast" 70 (hare) icon. A marker 72 indicating the actual speed is provided on the graphical speedometer as a comparator for the operator. The travel speed of the gun 38 can be calculated based on feedback from a sensor device in gun 38, as described above. A reflective material or LED type device and optical tracking, for example, can be used to determine the position and speed of the gun. Alternatively, a vector coordinate system can be used to determine the speed of the welding gun by integrating the acceleration signals coming from the multi-axis accelerometers described above. In this way the sensor can provide both angle and speed. By integrating the signal again, the torch position can be estimated in the vector coordinate system using the same sensor. Alternate methods for determining weld travel speed, are described in U.S. Pat. Nos. 4,399,346, 6,476,354, and 7,015,419, each of which are hereby incorporated by reference for their description of travel speed calculation methods. RF signal strength could also be used.

Referring now to FIGS. 7 and 7A-7D, in an alternate embodiment of the invention, a graphical representation of a gun 74, indicating that the gun angle is too high (FIG. 7A), too low (FIG. 7B), or that the push (FIG. 7C) or pull (FIG. 7D) angle should be adjusted can also be provided on a display 54 in the helmet 50, goggles, or glasses. The gun icon could, for example, be provided in a corner of the lens in helmet 50 as a signal to the operator.

As described above with reference to FIGS. 3 and 8, the helmet can also include audio generation devices for providing feedback to the operator. For example, a constant tone could be provided to the operator to indicate a change in a first direction (e.g. if the weld speed is too slow, or the angle of the weld is offset in one particular direction), and a pulsed tone to indicate an alternate change (too fast, angle offset in the opposite directions). A series of varying tones could be provided to indicate different directional changes. Words may also be used. A combination of visual and audio tones could also be used to indicate alternate directions and speeds.

Referring again to FIG. 9, although the feedback data is described above as gun position and travel speed feedback, it will be apparent that in an actual weld setting, other weld parameters could also be monitored. For example, expected voltage, current, wire stick out, arc length and wire feed speed could be stored with the welding program and feedback related to these parameters can be monitored during an actual weld. When the parameters fall outside of predetermined values, visual, tactile stimulation, or aural feedback can be provided to the operator as described above.

Referring again to FIG. 8, in an alternative embodiment of the invention, a weld operator can selectively choose weld feedback parameters (torch angles, torch travel speed, voltage, current, stick out, etc.) and operator feedback notification methods (tactile feedback, helmet display, audio feedback) for monitoring through the user interface 104 on the welding power source. The operator could also correlate a specific weld parameter to a feedback notification, and this correlation can be stored in memory 108 in the welding power source. The selected parameters could also be correlated with a specific operator. Other data, such as an operator identifier, operator height, and skill level can also be stored with operator preferences to simplify set-up for training.

Although specific embodiments have been shown and described, it will be apparent that a number of variations could be made within the scope of the invention. It should be understood therefore that the methods and apparatuses described above are only exemplary and do not limit the scope of the invention, and that various modifications could be made by those skilled in the art that would fall under the scope of the invention. It is also contemplated that headphones or ear buds could provide audio tones, and, as discussed above, that visual feedback could be provided on goggles or glasses.

Furthermore, although a number of different types of visual, audio and tactile feedback devices are described above for various applications, it will be apparent to those of ordinary skill in the art that these devices can be used in various combinations, and on a number of peripheral devices used by welding operators. For example, the tactile feedback devices described above can be applied to the handles of torches or guns, and to welding gloves, wristbands, and other devices, either alone or in combination. Audio devices and visual devices, such as light emitting diodes, can also be provided on gloves and torches, or on helmets and goggles. Indicator devices can also be provided on other peripheral devices, including wire feeders.

Additionally, the components of a welding system as described above with reference to FIG. 8 can be provided with various levels of functionality, and the analysis components in the system can be varied. For example, in some applications, the position analysis can be provided in the welding power source, and in other applications the position analysis can be provided in peripheral components such as a welding torch, welding glove, or welding helmet. In some applications, a positional feedback sensor and communications device can be provided in a welding operator device such as a torch, gun, or glove, and the positional feedback data can be transmitted to the power source, which analyzes the data. In some applications, the position feedback can be provided in a first welding operator device, such as a wristband, and an operator feedback device, such as a visual indicator, tactile feedback device, or audio device in a second welding operator device, such as a helmet or eye goggles. Feedback position data, moreover, could be gathered from various different devices and transmitted to a central controller, such as in the power source. Various combinations can be provided.

Furthermore, although operator feedback devices have been described mainly as associated with welding operator devices such as welding torches, gloves, and helmets, it will be apparent that feedback can also be provided in a welding power source, wire feeder, or other peripheral device. Therefore, the invention should not be limited to the embodiment described. To apprise the public of the scope of this invention, the following claims are made.

We claim:

1. A welding system comprising:
   a sensor configured to detect position or orientation data of a welding device; and
   a plurality of tactile feedback devices configured to provide directional feedback based at least in part on a comparison of the position or orientation data detected by the sensor and stored position or orientation data defining a position or orientation of the welding device for a stored weld to correct a position or orientation of the welding device during an actual weld or a simulated weld, wherein the plurality of tactile feedback devices are configured to be selectively controlled to provide different directional, tactile feedback to the operator based on the position or orientation data, and the plurality of tactile feedback devices are configured to be selectively controlled to provide an intensity to the directional, tactile feedback based on the position or orientation data.

2. The welding system of claim 1, wherein the directional feedback provides feedback to correct the position or orientation of the welding device during the actual weld.

3. The welding system of claim 1, wherein the directional feedback provides feedback to correct the position or orientation of the welding device during the simulated weld.

4. The welding system as recited in claim 1, wherein the sensor comprises at least one of an angle sensor, an altimeter, a global positioning sensor, a gyroscopic sensor, an accelerometer, a micro-electromechanical gyroscope, or an optical sensor.

5. The welding system of claim 1, wherein the tactile feedback devices comprise at least one of a vibrational motor, a piezeo-electric device, an air bladder, or an exoskeleton.

6. The welding system of claim 1, wherein the welding device comprises a protective eye shielding device, a welding gun, a glove, or a wrist band.

7. The welding system of claim 1, wherein the directional feedback provides feedback to correct an angle of the welding device.

8. The welding system of claim 1, wherein the tactile feedback devices comprise a plurality of spaced vibrational motors.

9. A welding system, comprising:
    a sensor configured to detect position or orientation data of a welding device;
    a plurality of tactile feedback devices; and
    a controller communicatively coupled to the welding device, wherein the controller is configured to:
        receive the position or orientation data from the sensor;
        compare the position or orientation data to stored position or orientation data; and
        selectively activate one or more of the plurality of tactile feedback devices to provide different directional, tactile feedback to prompt a welding operator to adjust a position or orientation of the welding device based at least in part on comparison during an actual weld or a simulated weld, the controller configured to control the plurality of tactile feedback devices to provide an intensity to the directional, tactile feedback based on the position or orientation data.

10. The welding system of claim 9, wherein the sensor comprises at least one of an angle sensor and an altimeter.

11. The welding system of claim 9, wherein the sensor comprises a global positioning sensor, a gyroscopic sensor, an accelerometer, or a micro-electromechanical gyroscope.

12. The welding system of claim 9, wherein the sensor comprises an optical sensor.

13. The welding system of claim 9, wherein the tactile feedback devices comprise a vibrational motor, a piezeo-electric device, an air bladder, or an exoskeleton.

14. The welding system of claim 9, comprising the welding device, wherein the welding device comprises a protective eye shielding device, a welding gun, a glove, or a wrist band.

15. The welding system of claim 9, wherein the directional feedback provides feedback to correct an angle of the welding device.

16. The welding system of claim 1, wherein the intensity is controlled based on a magnitude of error between the position or orientation of the welding device detected by the sensor and the stored position or orientation data.

17. The welding system of claim 9, wherein controller is configured to control the intensity based on a magnitude of error between the received position or orientation data and the stored position or orientation data.

* * * * *